US006990393B2

(12) United States Patent
Parker

(10) Patent No.: US 6,990,393 B2
(45) Date of Patent: *Jan. 24, 2006

(54) SERVICE PANEL WITH UTILITY CONTROLLER

(76) Inventor: Phil A. Parker, 715 FM 2888, Naples, TX (US) 75568

( * ) Notice: Subject to any disclaimer, the term of this patent is extended or adjusted under 35 U.S.C. 154(b) by 0 days.

This patent is subject to a terminal disclaimer.

(21) Appl. No.: 10/862,481

(22) Filed: Jun. 7, 2004

(65) Prior Publication Data

US 2005/0033479 A1   Feb. 10, 2005

Related U.S. Application Data

(63) Continuation-in-part of application No. 10/310,491, filed on Dec. 5, 2002, now Pat. No. 6,757,589, and a continuation-in-part of application No. 09/662,522, filed on Sep. 14, 2000, now Pat. No. 6,775,593.

(60) Provisional application No. 60/155,179, filed on Sep. 21, 1999.

(51) Int. Cl.
*G05D 11/00* (2006.01)

(52) U.S. Cl. .................................. 700/282; 137/624.11
(58) Field of Classification Search ................ 700/282; 137/624.11, 624.12, 39; 340/870, 870.01; 439/191–192
See application file for complete search history.

(56) References Cited

U.S. PATENT DOCUMENTS

| 3,417,212 A | * | 12/1968 | Driscoll ................... 200/43.08 |
| 4,841,287 A | * | 6/1989 | Flig et al. ................... 340/690 |
| 5,267,587 A | | 12/1993 | Brown |
| 5,331,619 A | | 7/1994 | Barnum et al. |
| 5,440,477 A | * | 8/1995 | Rohrberg et al. ............. 700/83 |
| 6,267,587 B1 | * | 7/2001 | Bishop et al. .............. 432/121 |

* cited by examiner

*Primary Examiner*—Leo Picard
*Assistant Examiner*—Alexander Kosowski
(74) *Attorney, Agent, or Firm*—Slater & Matsil, L.L.P.

(57) ABSTRACT

A utility controller and a service panel combination for limiting access to authorized persons. A sub-region of the service panel contains at least one electrically-operated (e.g., solenoid-operated) valve that is connected to service utilities (e.g., water or gas) piping so as to control flow therethrough. According to one embodiment, another sub-region (i.e., a utility controller region) contains electrical controls for controlling the valve(s) and communicating with other services such as a remote transmitter, or an auxiliary monitoring system (e.g., a fire alarm system). In another embodiment, the service panel is remotely located with respect to the utility controller. The controller facilitates provision of numerous features including: emergency shutdown by anyone while permitting reset only by authorized personnel; modular construction so as to facilitate installation of the system. Various jumper terminals and connecting wires provide for programming of the system to accommodate a variety of applications.

21 Claims, 28 Drawing Sheets

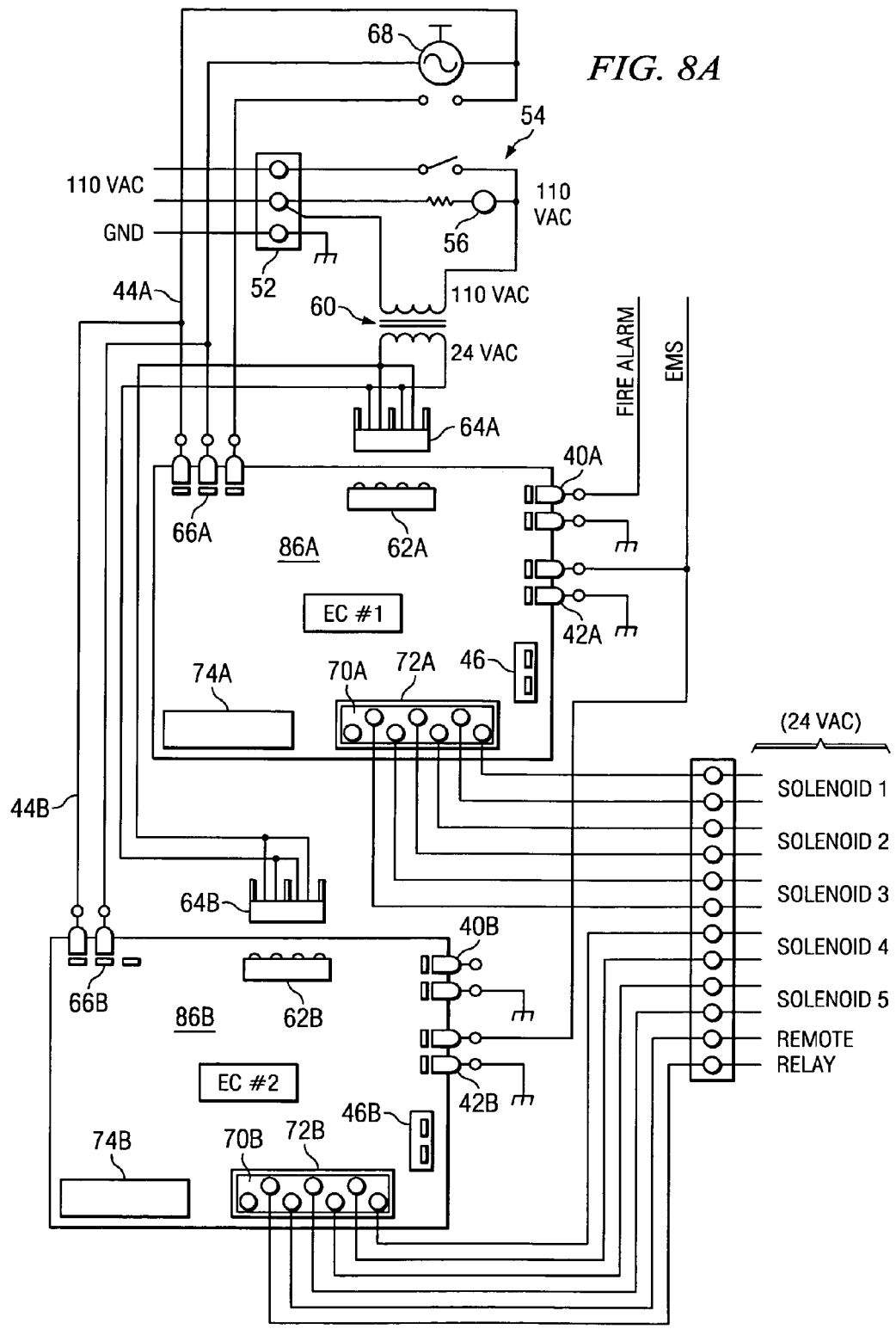

SERVICE PANEL WITH UTILITY CONTROLLER

This application is a continuation in part and claims the benefit of prior filed U.S. application Ser. No. 10/310,491, filed on Dec. 5, 2002 now U.S. Pat. No. 6,757,589, U.S. application Ser. No. 09/662,522, filed on Sep. 14, 2000 now U.S. Pat. No. 6,775,593, and U.S. Provisional Application No. 60/155,179 filed on Sep. 21, 1999, which applications are incorporated herein by reference.

BACKGROUND OF THE INVENTION

This invention relates to controlling utility services within buildings and more particularly to the logical control of such utility services.

Logical control of utility services within buildings has heretofore been proposed, illustrative of which are the proposals of U.S. Pat. No. 5,267,587 granted to Geoffrey P. Brown on Dec. 7, 1993 and U.S. Pat. No. 5,331,619 granted to Thomas G. Barnum, et al. on Jul. 19, 1994.

In the fields of plumbing and electrical, it is typically required that various services within building structures be provided with a means of control so that individual areas receiving these services can be isolated from other areas of the building for the purposes of repair.

A common method for this isolation of electrical services is a wall switch or an electrical breaker located within a service panel that is located at some remote location within the building. These switches and breakers typically control lights, electrical outlets and various pieces of equipment.

The common method for the isolation of plumbing services is a cut-off valve that is typically located above ceiling panels or concealed within a wall and accessed through a service panel. If the service is natural gas, then the cut-off valve can be located upon the roof. Cut-off valves control water to plumbing fixtures and equipment or gas to appliances.

In the field of construction of a building containing science laboratory rooms such as a school facility, it often is practical to control these services with another technique. This technique typically utilizes electrically activated contacts, relays, and solenoid valves. These electrical control apparatuses are typically controlled or activated by the turning ON or OFF of an electrical switch thereby energizing or de-energizing the apparatus. These switches can be located on a wall or concealed within a cabinet such as within an instructor's desk.

This alternative method of controlling these services regulates accessibility to the services, such that a classroom instructor can determine those times when the students in the classroom need the various services. When a service is needed, the switch can be turned to the ON position and access to the service is granted. On the other hand, when a service is not needed, the switch remains in the OFF position and access is denied. This alternative control method helps to prevent accidental or unauthorized use of the service. However, there are several disadvantages to the use of this type of control means. For instance, for maintenance purposes, if the cut-off valve and solenoid valve to the plumbing service is positioned in a concealed ceiling space, then it becomes necessary to first determine the location of the valve and then find a ladder or other device to gain access to the valve. If an emergency arises, it may be virtually impossible to close the valve within a short period of time. Also, if these valves are located upon the roof, there is the need to first gain access to the roof before any maintenance can be performed.

Because the service and solenoid valves are remotely located away from the controlling switch, it is necessary to install wiring from the controlling switch to the control valve. Therefore, detailed coordination between the electrical wiring and the plumbing is needed. The exact locations of the valves and the voltage necessary to activate the solenoid valves must be coordinated.

In addition, as is often the case in the installation of natural gas services, it is necessary that the concealed gas piping and valve apparatus be within a secondary containment enclosure. In such a case, when the gas service is controlled by an electrical solenoid, it is essential that not only the pipe and valve be sealed within the enclosure but also that the electrical conduit and wiring connections be likewise sealed. To properly accomplish this requirement, it is necessary that the other conduit connector be airtight, but also, the wiring within the conduit must be sealed airtight.

In the case of remote control of the electrical service to the classroom, typically a remote set of contacts or a relay is utilized to control the electrical outlets. This relay may be located within an access panel or box and located within the ceiling space. An electrical switch located within the room activates the relay.

Since it is the intent of this technique of controlling the various services to the classroom to restrict access to the services, then it becomes necessary to provide a method to deny or regulate access to the controlling switch. In other words, if the instructor does not choose to permit the use of a service such as the cold water outlets in the room, then the electrical control switch should be left in the OFF position. If it is desired that the activation of this switch be strictly enforced, then this switch must be located within a locked and/or concealed containment area such as the instructor's desk.

However, under these described conditions if an emergency arose it would become necessary for the instructor to first unlock the containment area before the switch could be turned OFF and the service deactivated. Also, if the instructor were to be called away from the classroom momentarily, then there would be no means of deactivating the service in the event of an emergency.

Not only would this configuration create a potential hazard, but also it restricts future repositioning and arrangement of the classroom. For instance, since the instructor's desk has electrical switches that are firmly connected with wiring through electrical conduits, it is impossible to move or reposition the desk without first disconnecting these conduits.

To help prevent such emergency situations electrical panic-type push buttons are often positioned near the exit to the classroom. These panic buttons are typically connected to a building fire alarm system. Though these panic buttons may deactivate the services during emergency situations, it does become necessary to provide the wiring so that the remotely-located solenoid valves and electrical relays can be disengaged.

Also to be considered is a situation whereby the instructor fails to deactivate a service at the end of the classroom day. In such an event, the service would remain active through non-use periods. If any emergency arose during these times, then there would be no way to prevent a catastrophe.

To explain such a situation, suppose that near the end of the school day a student inadvertently leaves a cold water faucet open at a sink, and suppose that the drain to this sink has become clogged preventing the drainage of the water from the sink, by the beginning of the next school day a tremendous amount of water damage could occur within the classroom. Further, if the event occurred prior to an extended weekend or holiday, then this damage could likely extend to the entire school.

Now suppose that rather than a water outlet there was left open a gas valve. The results of such an event could be catastrophic. Clearly, a better method to control these services to school science classrooms needs to be found.

There presently exists a means to remotely control and activate the various "HVAC" systems located within the building. This method is commonly referred to as "EMS" or energy management system. Though this "EMS" does have the capability to regulate time intervals when services can be activated, presently there does not exist a common link between the "EMS" and the activating switches for science classroom services.

Since different schools or classrooms may have different needs, it would also be advantageous to allow for different configuration of the utility controller unit as well as for easily adding upgrades to the system after installation. Similarly, in certain instances, it may also be advantageous for cost savings and/or simplicity of operation to control two different but similar utilities by a single control circuit. For example, domestic hot and cold water could be turned on by a single circuit, and thereby allow control of another utility.

Further, the ability to activate and deactivate various circuits from any position in a classroom may also be important. Therefore, the ability to upgrade the system to generate control signals by remote control is important.

Continuous monitoring of the system at a high level is important. However, every instance of an emergency situation may not actually be an emergency. Therefore, the ability for the classroom instructor to neutralize a situation that is not actually an emergency without alerting high level monitoring could be a great benefit.

SUMMARY OF THE INVENTION

The service panel with utility controller according to the invention hereof comprises an access service panel to contain the control components, the cut-off valves, the various pipe fittings, solenoids, relays, switches, wiring, connectors and locks; all of the major components needed to control and activate the various services that are utilized in a typical school classroom while ensuring the safety of the students in the classroom.

More specifically, the utility controller of this invention comprises an enclosure having an interior region. Access to the interior region is limited such as, for example, by a cover with a keyed lock. There is also included at least one utility actuator that can be switched between an "ON" state and an "OFF" state in response to a control signal. The availability of a utility is controlled by the actuator. Control circuitry typically carried on a printed circuit board is located within the interior region and is coupled to the actuator for providing the control signal. The printed circuit board generates the control signal in response to receiving either an ON or OFF request signal that results from activating a readily accessible ON/OFF utility switch.

The control circuitry further includes a multiplicity of jumper terminals which are selectively connected to program the operation of various features available at a utility controller. A key switch provides limited access and is used to enable the utility switch. There is also included a readily accessible emergency shut-off control switch for providing a shutdown signal to the control circuitry. When the emergency shut-off switch is activated, a control signal is sent to the utility actuators to switch any and all of the utilities that are available (ON) to the OFF condition. The shutdown control switch also disables the utility controller until it receives a "reset" signal. The reset signal is provided by a reset switch located in the interior region such that only individuals having a key to the cover lock can access the reset switch.

According to another embodiment, the printed circuit board also includes RF circuitry for receiving RF transmissions from a hand-held transmitter for remotely controlling the controller.

Object and advantages of the present invention include: providing an accessible service panel with a logic controller containing the major components needed for the control of the various services typically utilized in school science classrooms; providing a service panel with a logic controller where the components are pre-selected and pre-assembled to insure compatibility in the installation and further permitting ease in the installation process; and providing a service panel with a logic controller having the means to insure the safety of the students occupying the classroom.

Further objects and advantages are to provide a service panel that restricts the unauthorized use of the various services to the science classroom. The door-mounted indicators provide for ease in determining the services that are activated. Because a key is needed to activate but not deactivate the services, usage of the service panel is made simple. Restricted access to the interior compartment of the service panel is further limited to authorized maintenance personnel. This feature prevents inadvertent injury to non-authorized persons. It further prevents potential damage to the interior components of the service panel. However, according to one embodiment, because the plumbing cut-off and solenoid valves are located within the panel compartment, their maintenance is made easy.

Since control and access to the panel is restricted, the service panel with utility controller can be located in plain sight and near the exit to the classroom. Therefore, the panic button mounted upon the door of the service panel will deactivate the services in the event of an emergency. This panic button can also be connected to the building fire alarm system, thus notifying authorities in the event of an emergency. Further, after the pressing of the panic button, it is necessary to reset the utility controller prior to reactivation of the services. Therefore, since the reset switch is located within the service panel, the possible reactivation during an emergency is avoided.

Because the utility controller of this invention also includes the means to regulate the time of day that the service panel can be activated and deactivated, the risk that a service is inadvertently left active is avoided.

Another further advantage is that, according to one embodiment, the utility controller is located within the service panel, which also houses the electronic controller and other electrical components. This unique design prevents potential water damage to the component due to leakage in water service piping.

Further, requirements that natural gas piping be within a secondary containment enclosure are also achieved. For example, according to one embodiment, although the utility controller has exposed electrical wiring that enters the box through non-sealed conduit, it also has a gasketed door that, once closed and secured, seals it from the main service panel. The service panel having a gasketed door panel thus becomes the required secondary containment enclosure.

The electrical relay for control of electrical outlets may be remotely located, however, the control switch and necessary wiring and other control components may still be centrally located with the switches for the other various services.

Further, since the service panel and utility controller may be provided as individual components, the service panel with pre-assembled piping, the door assembly, and the utility controller, there is a reduced possibility of potential damage to various components during the rough-in stages of the construction of the building. In other words, components are assembled as needed rather than at one time which is the case in many other applications.

Also, because the service panel and utility controller contain pre-wired components with disconnect switches, there is ease in maintenance.

Further objects and advantages of the invention will become apparent from the consideration of the drawings and ensuing description.

BRIEF DESCRIPTION OF THE DRAWINGS

FIGS. 8A through 8C show the electrical circuitry of the remotely-mounted utility controller of FIG. 7;

DETAILED DESCRIPTION OF THE INVENTION

The invention is a service panel having an integrated utility controller for controlling the various services typically utilized in a science classroom, such as for example, only shown in FIGS. 2, 8, 9, 11, 16, 18, and 19. The panel, doors and other containment components are preferably constructed of welded sheet metal, and contain the various components needed for the control of selected utilities.

Figure 1:
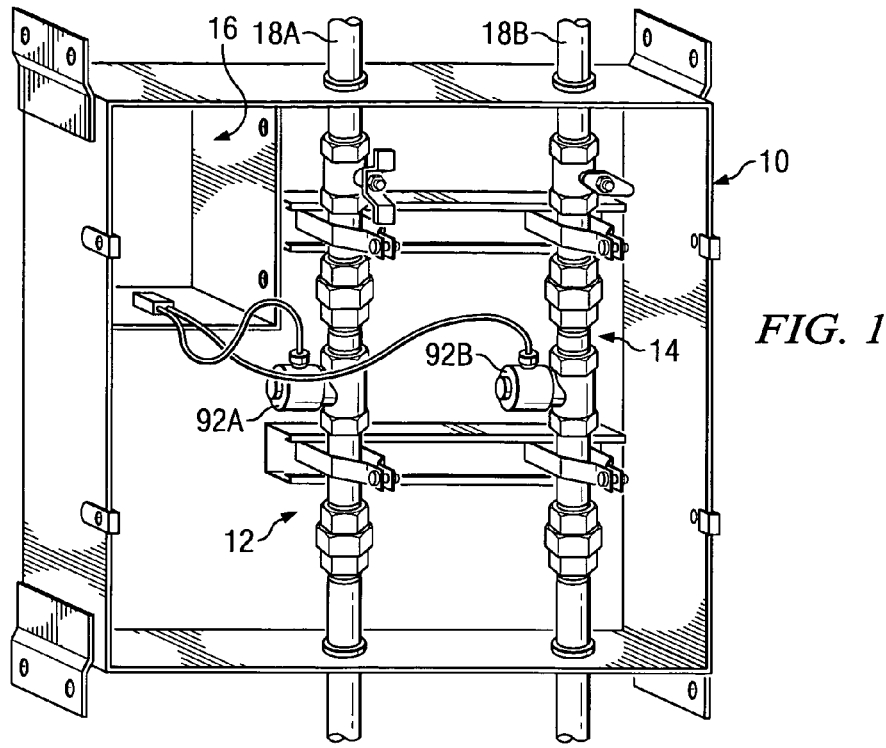
FIG. 1 shows the service panel.

As shown in FIG. 1, and according to one embodiment, the interior of the service panel 10 houses the water cut-off valve 12 and the gas cut-off valve 14. A utility controller is positioned in the upper left hand portion area 16 of the service panel. The entry points of service piping 18A and 18B into the panel 10 are preferably sealed airtight.

Figure 2:
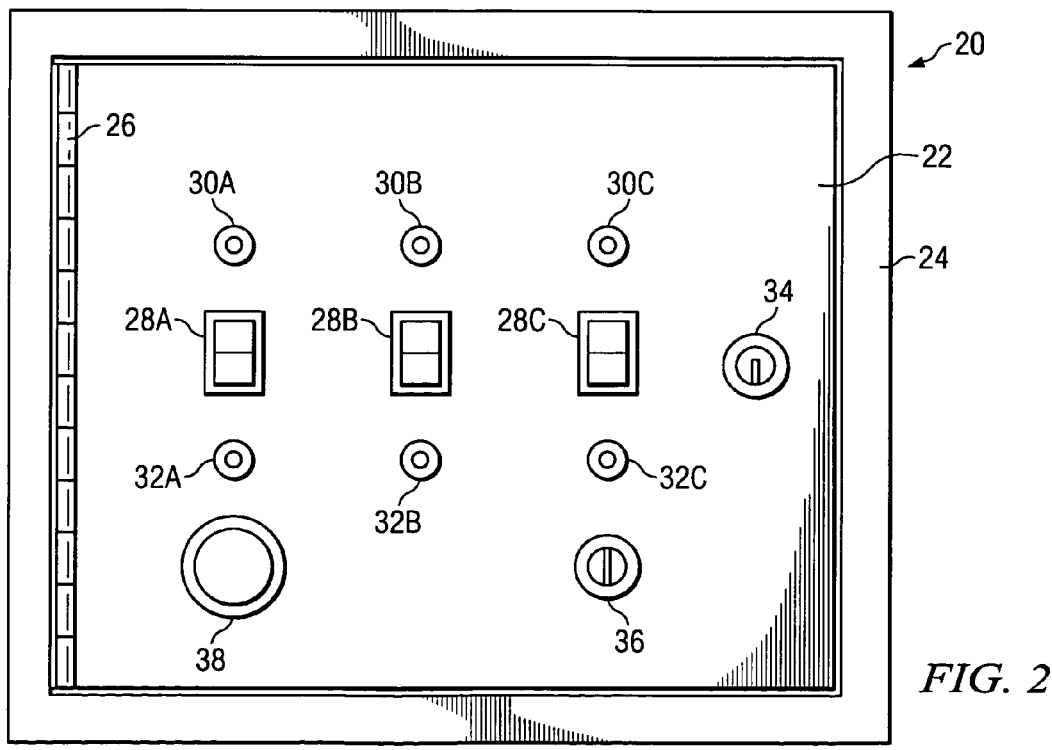
FIG. 2 shows the door panel assembly.

Now turning to the door panel assembly, FIG. 2 shows a plane frontal view of door panel assembly 20. In the illustrated embodiment door panel 22 is affixed to doorframe 24 with a continuous hinge 26. On the surface of the door panel are mounted three control switches 28A, 28B, and 28C for controlling three different services. Various types of switches are suitable, but rocker type normally open, single pole, single throw switches have been found to be particularly suitable. In the illustrated example, one switch controls the electrical service, the second controls the domestic cold water service while the third controls the gas service. Above each control switch is an indicator (LED) 30A, 30B, and 30C that shows whether the service is in the active state or not. Below each control switch is a second indicator (LED) 32A, 32B, and 32C to indicate if the service was active during a scheduled shutdown. A keyed lock 34 is mounted at the side opposite to the continuous hinge 26. Keyed switch 36 is positioned on the lower area of the door panel. This keyed switch 36 may be, for example, a normally open, key activated single pole, single throw switch with momentary contact having the capability of being removed only from the OFF position. Adjacent to this keyed switch is located panic button assembly 38. This panic button is of a conventional design that is typically utilized in similar conventional applications. It is a normally open single pole momentary push button switch. Because of its common usage in the electrical industry, no further description is provided. All switches, lights and locks are mounted to the door panel using common means and methods as provided by the manufacturers of these components.

Figure 3A:
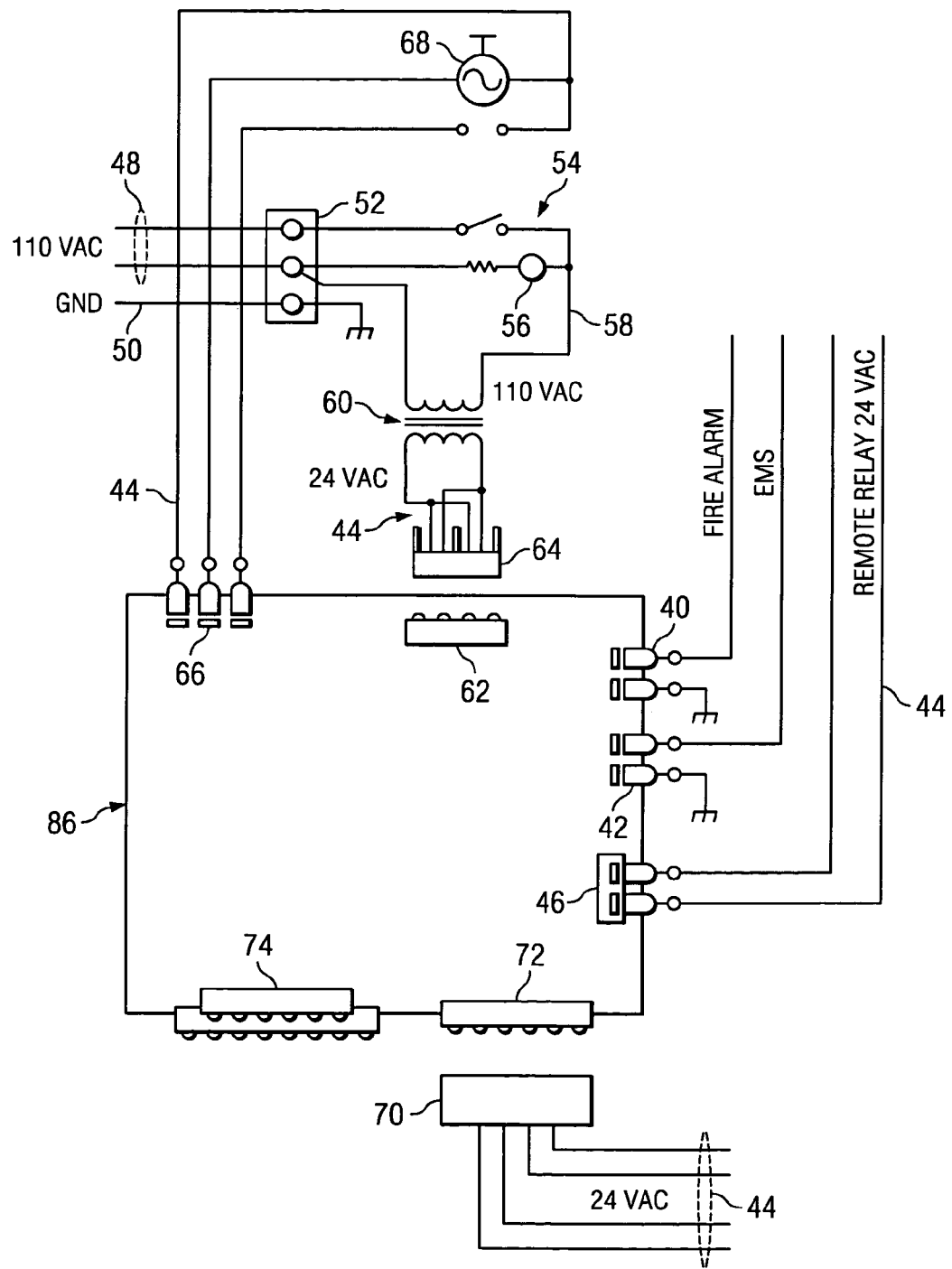
FIGS. 3A and 3B show the utility controller.
Figure 3B:
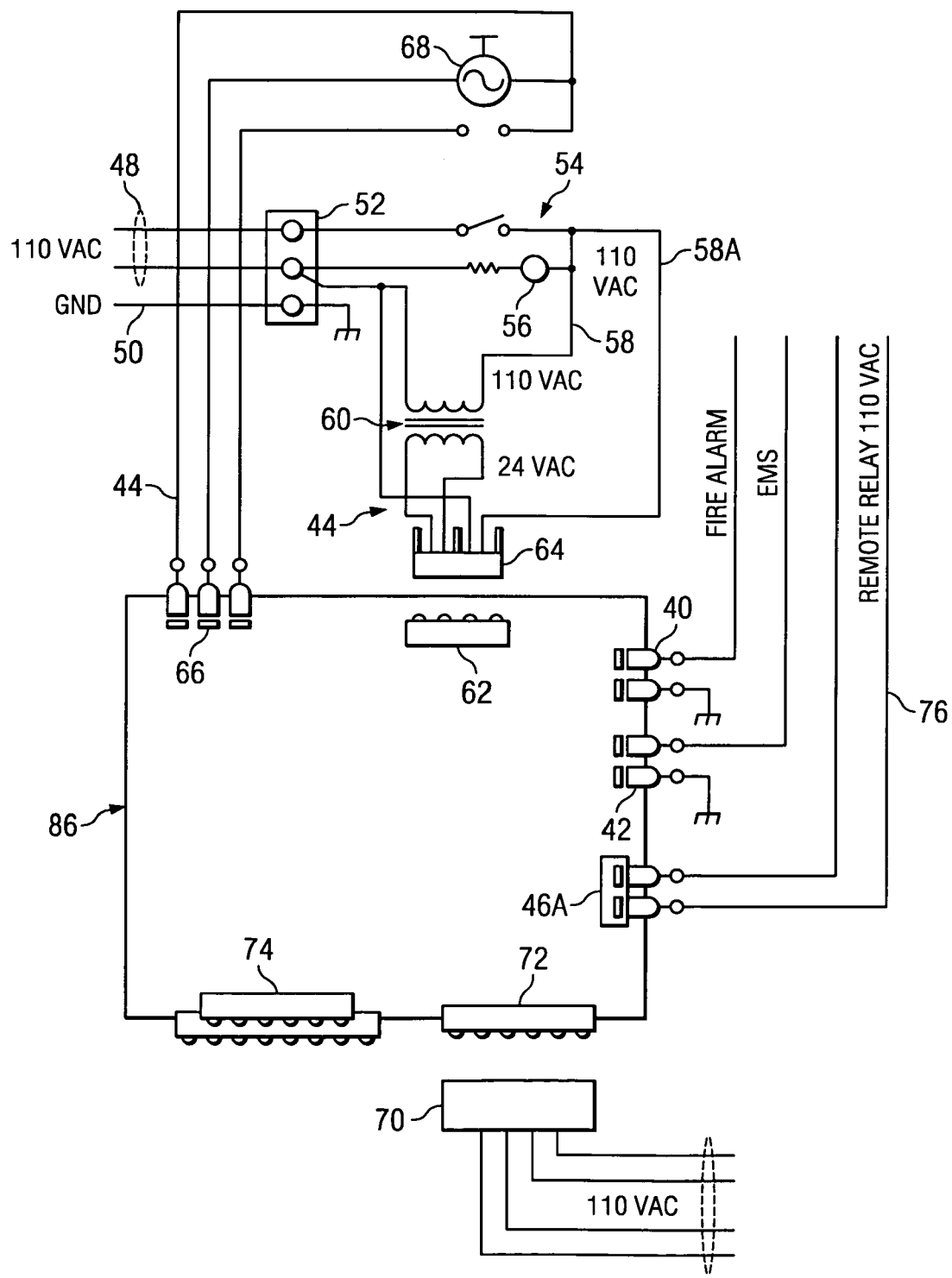

FIGS. 3A and 3B show the overall wiring diagrams for the series panel and the utility controller according to the present invention. To avoid repetition in the description of the preferred embodiment as well as alternate embodiments of the invention, detail is given for the wiring diagram for a basic embodiment while only modifications are described for the various additional and alternative embodiments.

FIG. 3A shows the wiring diagram when 24 VAC is used to activate the solenoids and remotely-located electrical relay. Wiring from the building fire alarm is field-connected to fire alarm terminal 40. Likewise, wiring from the "EMS" (energy management system) is field-connected to "EMS" terminal 42. Low voltage wiring 44 is field-installed and extended from remote relay terminal 46 to a remotely-relocated and field-installed electrical relay. Line voltage wiring 48 and grounding wire 50 are field-installed and connected to power terminal 52. The line wire is routed through combination switch/circuit breaker 54. A common line is also connected to this switch so that the ON/OFF indicator light of 56 this switch will be illuminated when in the ON position. Line voltage wiring 58 is thus routed through this switch to low voltage transformer 60 while the common lead is connected directly to the transformer. Low voltage wiring 44 is connected from this transformer to controller power terminal 62 with power plug 64. Power plug 64 is a polarized plug insuring proper fitting to the terminal. Because this embodiment of the invention utilizes low voltage current to activate the solenoids and remote electrical relay, leads on the power plug are interconnected. Low voltage wiring 44 is extended from reset terminal 66 to reset switch 68. Two leads with a single ground are used. This allows the normally open single pole momentary reset push button switch to reset the electronic controller from the panic state to the shutdown state when pressed. As will be discussed in more detail hereinafter with respect to the "sequential state controller" diagram of FIG. 4, the panic condition is the "1111" state and the shutdown condition is the "0000" state. The LED within the button of the reset switch remains illuminated until reset occurs at which time it loses illumination. Solenoid plug 70 is connected to solenoid terminal 72. Low voltage wiring 44 thus extends to the solenoids. Door panel terminal 74 receives door panel plug 88 (not shown).

FIG. 3B shows the wiring diagram for utility controller when 110 VAC is used to activate the solenoids and remotely-located electrical relay. In this embodiment, line 58A extends the line voltage wiring 58 from combination switch/circuit breaker 54 to one set of contacts on power plug 64. In this instance, these leads are not interconnected with the low voltage wiring 26 from low voltage transformer 27. Line voltage wiring 76 thus extends from solenoid plug 64 and remote relay terminal 46A.

Figure 4:
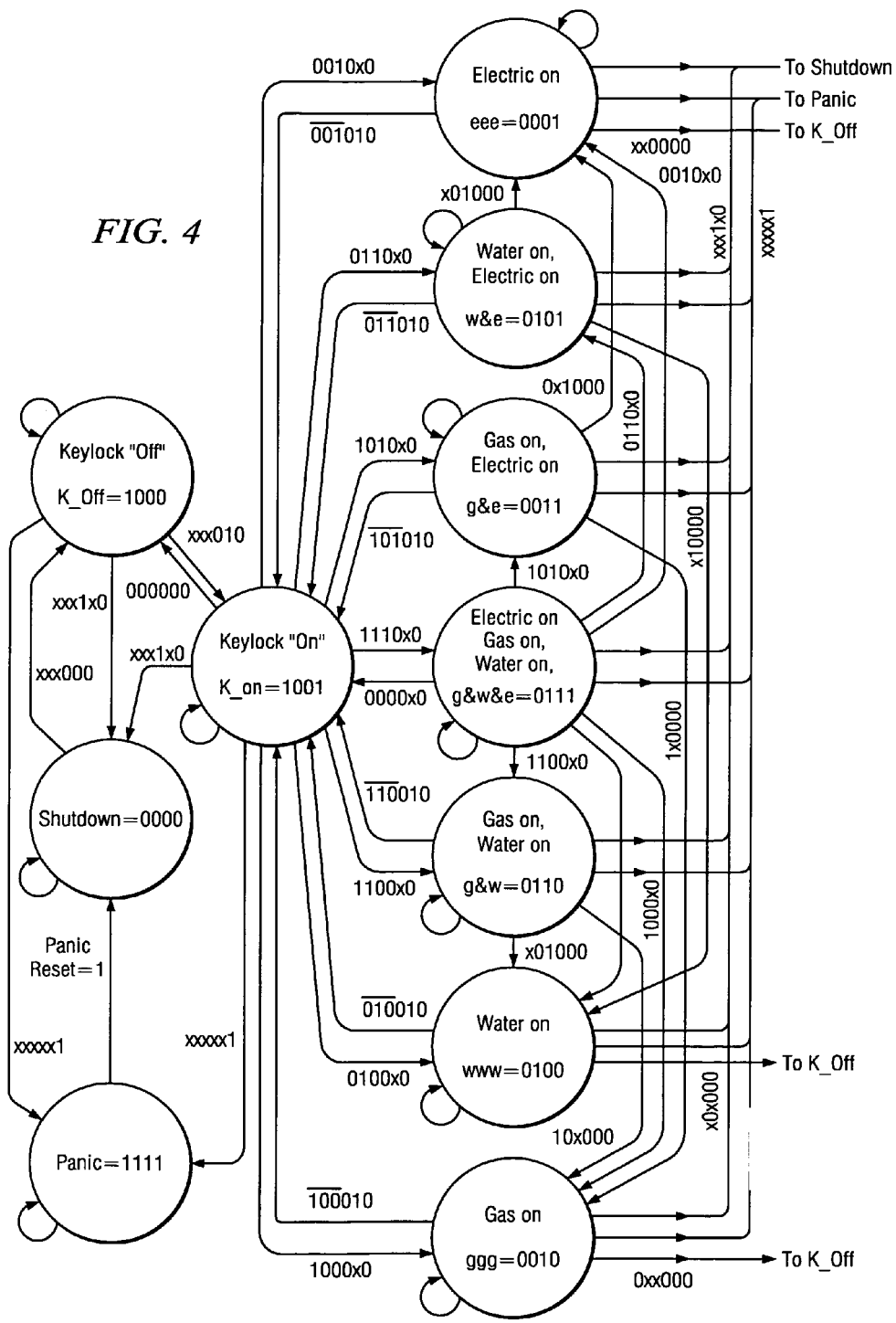
FIG. 4 is a sequential state controller diagram for the electronic controller.

FIG. 4 is the aforementioned sequential state controller diagram for the controller. To facilitate understanding thereof, it should be noted that operation of the utility controller or the laboratory service panel is achieved by moving from one logical "state" to another, based on inputs to the system. As inputs to the system change, the state of the system changes. If no inputs are changing, the system remains in the current state. There are sixteen (16) different states used in this system, which are encoded using four (4) digital bits. The encoding is as shown in Table 1 below.

TABLE 1

| Decimal | MSB-LSB | State Name | Outputs Turned On |
| --- | --- | --- | --- |
| 0 | 0000 | Shutdown | None |
| 1 | 0001 | EEE | Electric relay |
| 2 | 0010 | GGG | Gas relay |
| 3 | 0011 | G&E | Gas & Electric relays |
| 4 | 0100 | WWW | Water relay |
| 5 | 0101 | W&E | Water & Electric relays |
| 6 | 0110 | G&W | Gas & Water relays |
| 7 | 0111 | G&W&E | Gas, Water & Electric relays |
| 8 | 1000 | K_off | None |
| 9 | 1001 | K_on | None |
| 10 | 1010 | Delay2 | Water relay |
| 11 | 1011 | Delay1 | Water & Electric relays |
| 12 | 1100 | Shut2 | Water relay |
| 13 | 1101 | Shut4 | Electric relay |
| 14 | 1110 | Shut1 | Water & Electric relays |
| 15 | 1111 | Panic | Alarm output |

The circuits preferably employed are a "Moore" type, with the output conditions based only on the current state the sequential state controller is in, and not on a combination of the current state and input conditions. This aids in preventing asynchronous noise from causing states to erroneously change.

The inputs to the sequential state controller are the three utility switches 28A, 28B, and 28C, the enabling key switch 36 and the panic button 38 as shown in FIG. 2 along with an energy management system input (EMS). The inputs to the logic device are controlled so that the entire device is synchronous. The sequential state controller diagram in FIG. 4 shows the progression through the states as a function of the input variables.

Figure 5:
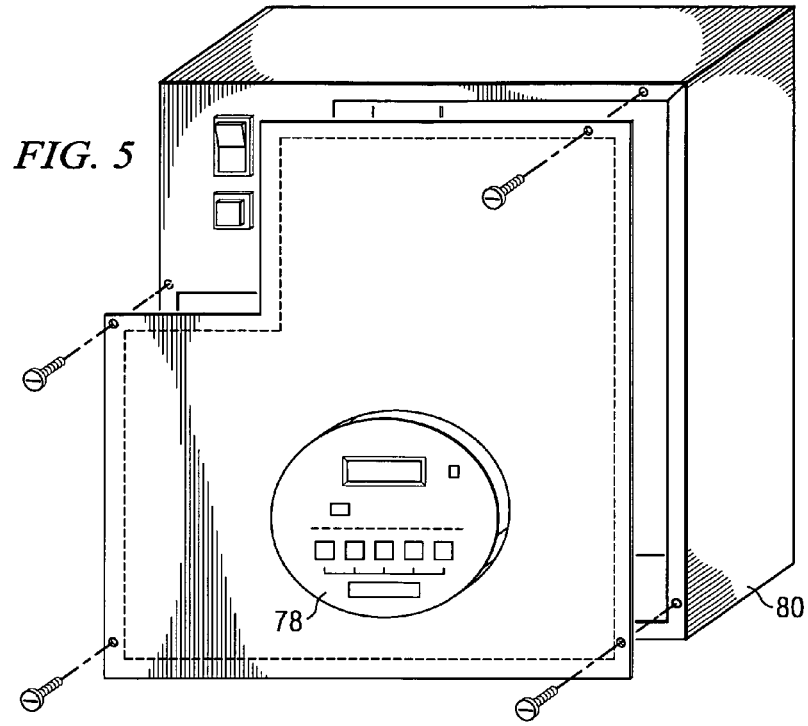
FIG. 5 shows the use of an optional conventional digital timer to regulate times of permissible operation of the service panel.

There are, of course, instances where a school building or facility does not have "EMS". In those cases and as illustrated in FIG. 5 with respect to another embodiment, an optional conventional digital timer 78 is mounted internal to the service panel 10. This timer will activate and deactivate the service panel and utility controller 80 at programmed time intervals. Because this timer is located within the service panel 10 at utility controller 80, unauthorized times of activation cannot be programmed.

Figure 6:
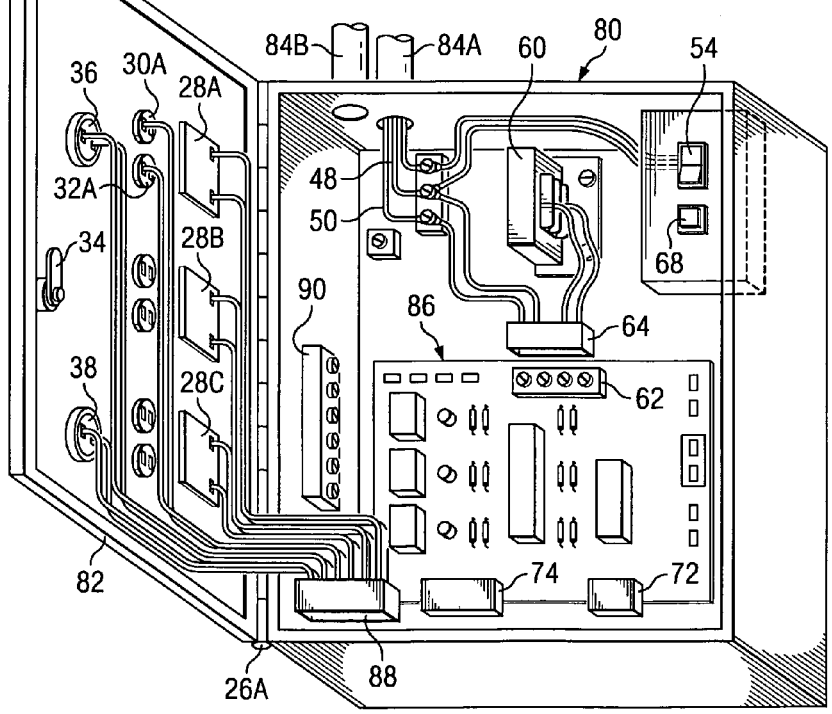
FIG. 6 details the utility controller when mounted remotely from the service panel along with the respective wiring diagram.

There are various possibilities with regard to the many uses of the service panel 10 of this invention and utility controller 80. The utility controller can be mounted remotely from the service panel 10. FIG. 6 demonstrates such a remote positioning. In this configuration, a secondary door 82 is affixed to utility controller 80, with a continuous hinge 26A. Line voltage wiring 48 and ground wire 50 enters the box through electrical conduit 84A and connected to power terminal 52. In this configuration, the power source for the solenoids and remote electrical relay is 110 volts A/C. The 110 volt current as well as the low voltage power to the electronic controller is provided to power plug 64, which in turn is inserted at controller power terminal 62. Solenoid terminal 72 and door panel terminal 74 are positioned vertically from electronic controller 86. Unlike the previously discussed embodiment, this alternate positioning of these terminals permits ease in connecting door panel plug 88. Control switches 28A, 28B, and 28C indicators (LED) 30A, 30B, 30C and 32A, 32B, 32C along with keyed switch 80 and panic button assembly 38 are positioned on secondary door 82. The utility controller 80 is secured by means of keyed lock 34. Though not shown, solenoid plug 61 is electrically connected to secondary terminal 90. From this terminal 90, field wiring is extended through electrical conduit 84B to the service panel. Combination switch/circuit breaker 54 and reset switch 68 along with low voltage transformer 60 are positioned within the utility controller 80. As was discussed with regard to FIG. 5, an optional conventional digital timer can likewise be used to regulate and control times of activation when the utility controller 80 is located remotely from the service panel 10.

Figure 7:
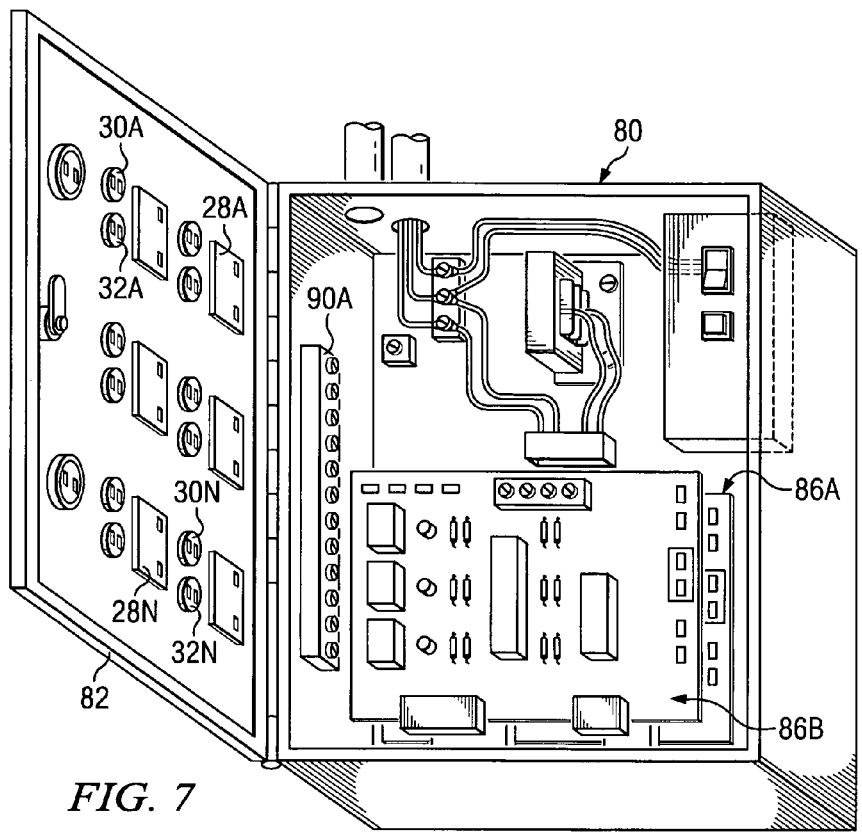
FIG. 7 shows the remotely-mounted utility controller with more than one electronic controller mounted within.

As illustrated at 86A and 86B in FIG. 7, more than one electronic controller 86 may be positioned within the same utility controller 80. Sufficient control switches 28A, 28B . . . 28N and indicators (LED's) 30A, 32A, 30N, 32N are positioned on secondary door 82 so as to permit the individual control of each controlled service. In this alternate embodiment, secondary terminal 90A contains sufficient connection points for the number of services controlled. With the exception of the added number of electronic controllers and required control switches, all other components are similarly shown in FIG. 6.

FIG. 8A is the wiring diagram for this alternate configuration, and as can be seen this configuration has two electronic controllers "EC # 1" and "EC # 2". Power to the controllers is provided through power plugs 64A and 64B to controller power terminals 62A and 62B respectively. Output current to activate the remote solenoids and electric relays are gathered at secondary terminal from each respective solenoid plugs 70A and 70B. These wires provide low voltage control current to solenoids within a remotely-mounted service panel. This control wiring is field-installed. Reset terminals 66A and 66B are parallel wired to reset switch 68 with only one controller providing the DC signal needed to illuminate the LED. "EMS" wiring, along with fire alarm wiring, is connected to each controller. Remote relay terminals 46A and 46B are not utilized.

Figure 8B:
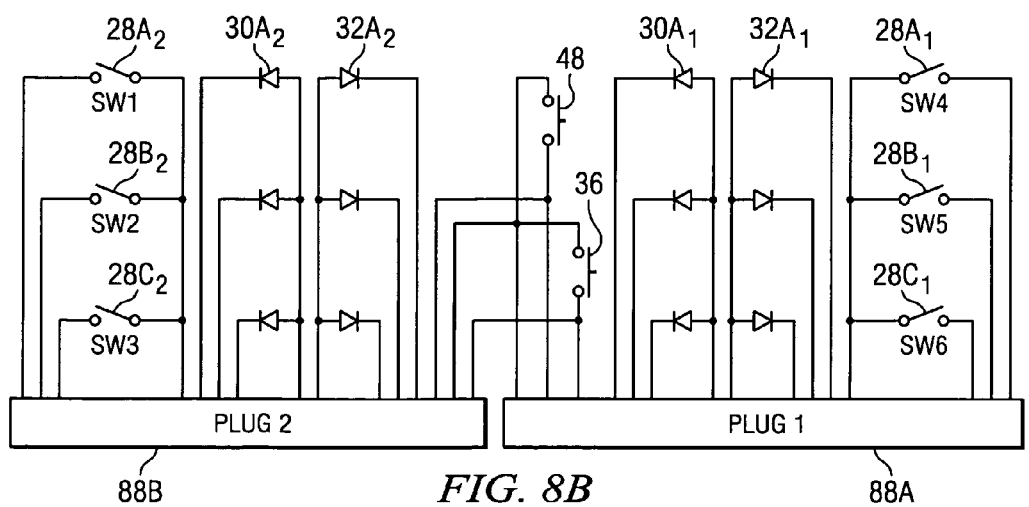

FIG. 8B is the wiring diagram for the secondary door. Each controller will be interconnected to the respective control switches 28A, 28B, and 28C and the indicators (LED) 30A, 30B, 30C and 32A, 32B, 32C with the respective door panel plug 88A or 88B. Keyed switch 36 and panic button assembly 38 are wired parallel to each door panel plug.

Figure 8C:
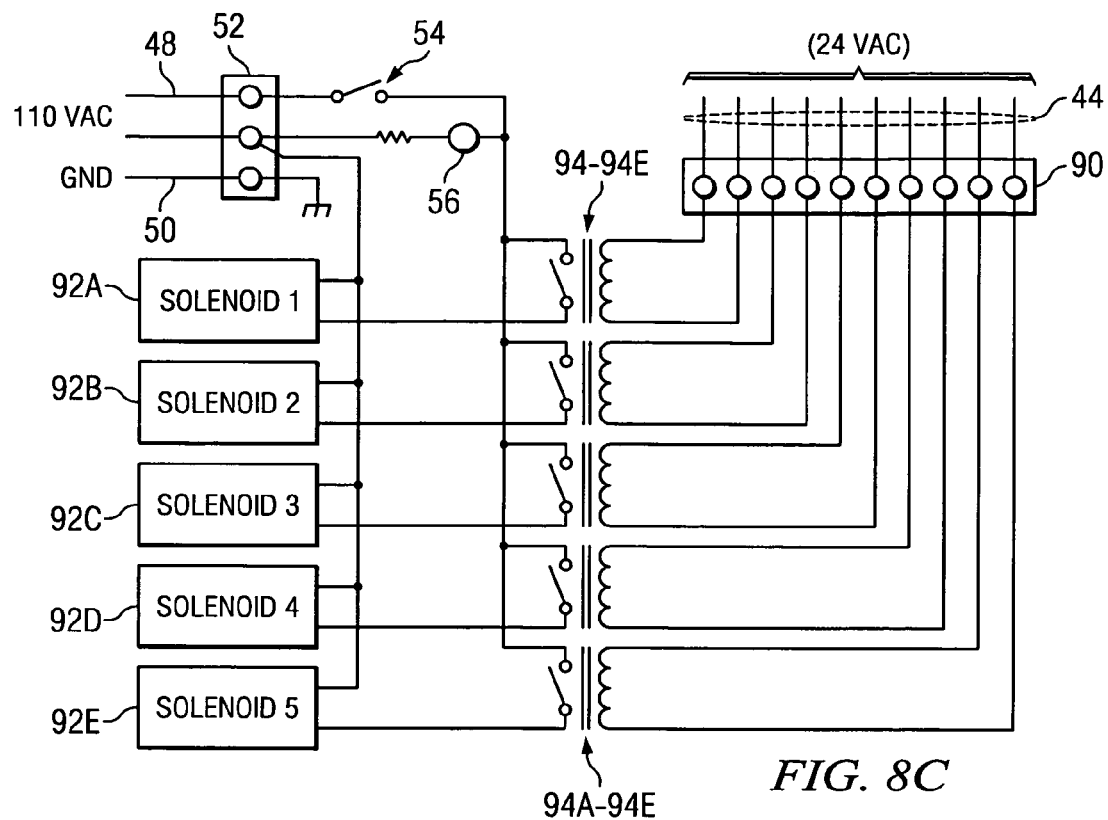

FIG. 8C demonstrates how low voltage wiring provided by the remotely-mounted utility controller is connected to solenoids 92A, 92B, 92C, 92D, and 92E within the service panel. These low voltage wires are field-connected to a secondary terminal 90. From there, connections are extended to a series of remote relays 94A, 94B, 94C, 94D, and 94E. These relays are normally open, single pole relays having a 24 VAC coil. Energizing the relay activates the respective 110 VAC solenoid 92A, 92B, 92C, 92D, and 92E. Similar to utility controller wiring, field-installed line voltage wiring 48, as well as a grounding wire 50 are connected to power terminal 52. Combination switch/circuit breaker 56 provides the ON/OFF electric capability for the service panel power.

Figure 9:
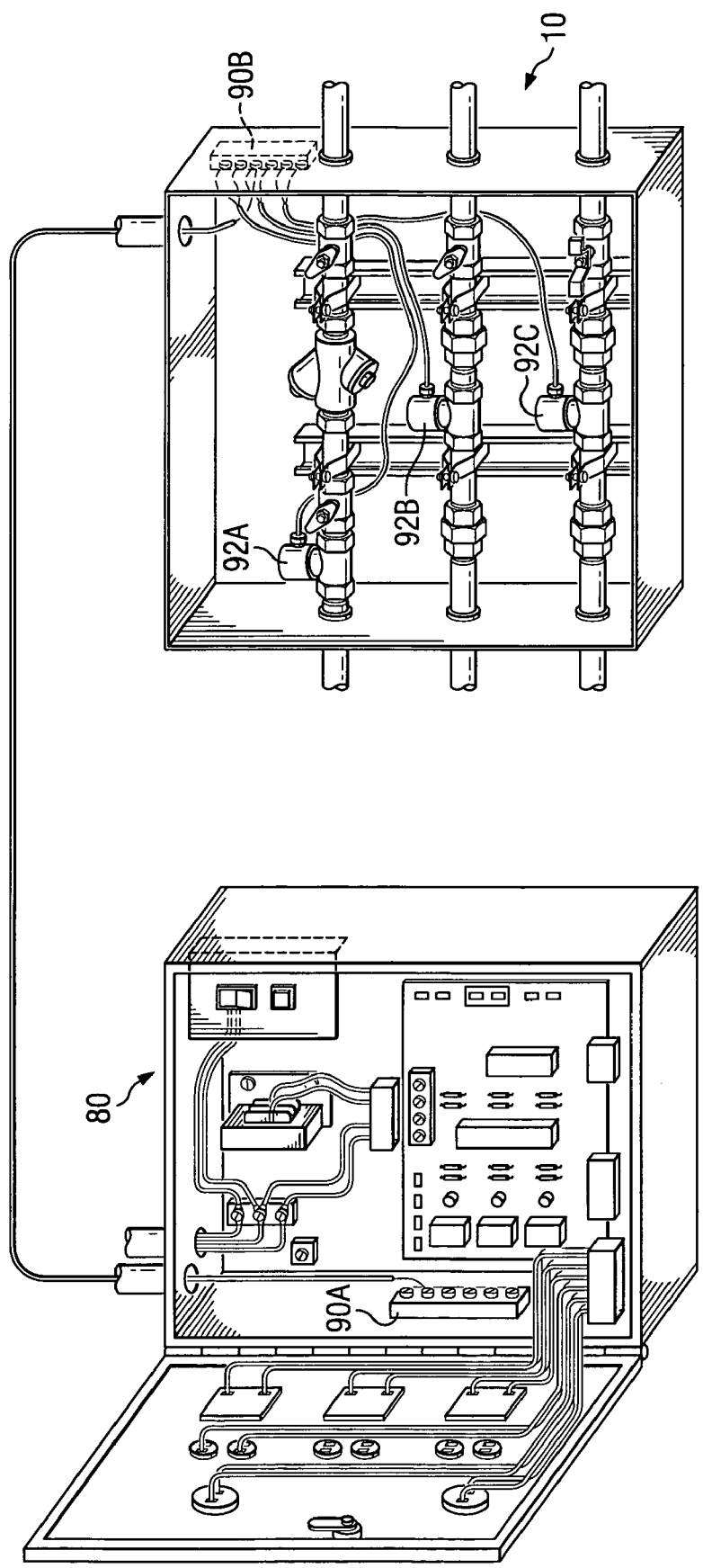
FIG. 9 displays the wiring technique for the service panel with the utility controller being mounted remotely.

FIG. 9 demonstrates the basic wiring and panel configuration when utility controller 80 is mounted remotely from the service panel 10. In this illustration, line voltage control wiring originates at secondary terminal 90A within the utility controller 80 and is field-installed from it to the service panel 10 and terminated at secondary terminal 90B. Solenoids 92A, 92B, AND 92C are wired to the corresponding terminal post. Though not shown for clarity, a door panel assembly is mounted onto the service panel to conceal the interior apparatus.

Figure 10:
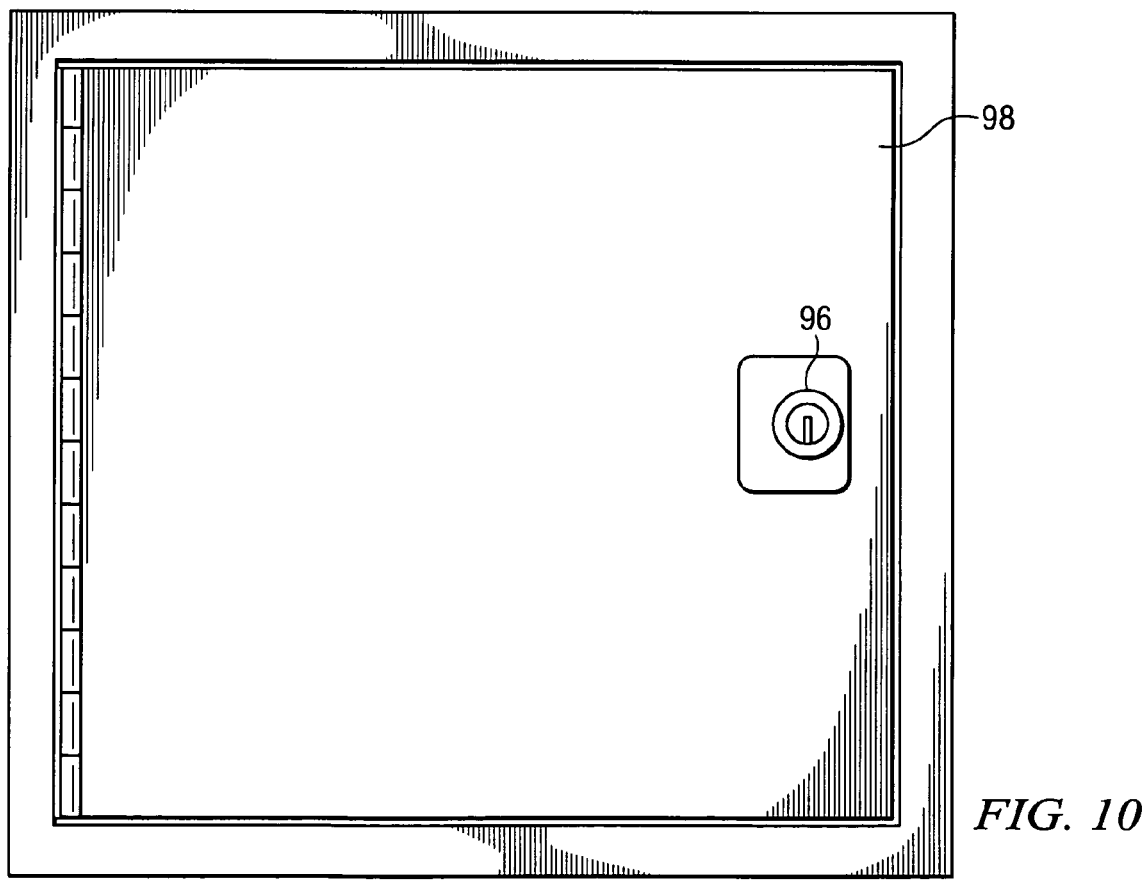
FIG. 10 is an alternate view of the door panel assembly when the utility controller is mounted remotely.

FIG. 10 illustrates a modified door panel assembly used when the utility controller 80 is remotely mounted from the service panel 10. Door lever with lock 96 permits the door panel 98 to be locked and secured while permitting ease in opening the door when unlocked. The door lever with lock is of common construction intended for such purposes.

From the description, the many advantages of the present invention can be seen.

It is a very practical apparatus that will provide the means to control the various services typically needed in a science classroom.

It prevents unregulated use of the controlled services.

It prevents unauthorized entry to the secured compartment.

It will automatically disengage during non-scheduled periods.

It will sound an alarm in case of emergency.

Although a person of authority must activate a service, it permits persons without that authority to deactivate the service.

It will indicate an improper shutdown of controlled utility services if the "EMS" shuts down the utility controller while a switch is in the active state.

Once installation and assembly are completed, the service panel with utility controller is ready to be placed in service.

To activate the individual services that are controlled by the service panel and utility controller, the "EMS" must first be in the active state. Once that is done, it is necessary that the keyed switch be turned to the ON position. At this point, control switches become active and individual services can be energized.

The turning ON of these switches energizes a relay located on the electronic controller. This relay in turn energizes the service control mechanism. In the case of the electrical service, this mechanism is a field-installed electrical relay remotely located in a separate service panel.

The service panel is secured from unauthorized entry by the keyed lock. Access is gained by unlocking and opening the door panel. Once opened, the combination switch/circuit breaker is turned OFF prior to any maintenance procedures.

Once the control switch energizes services, the momentary keyed switch returns to the OFF position and is removed without disrupting the active services. These services will remain active as long as the control switch remains in the ON position. Once a control switch is turned OFF, then the service returns to the non-active state. To re-energize the service, it is necessary to re-insert the key and again turn the switch to the ON position. This design feature prevents unregulated use of the individual services.

As was mentioned before, the means by which the utility controller regulates the time intervals for the service panel to be active or inactive is by this inner connection to the "EMS". Since a conventional "EMS" will turn ON and OFF such equipment as heating and cooling air units or "HVAC", it is practical for the same signal sent to activate this equipment to likewise activate, or in like deactivate, the service panel and utility controller. The electronic controller is the means by which this becomes possible.

Also as shown in FIG. 4, if the panic button assembly 38 is pressed, the controller will go to the "1111" state and requires it to be reset to the "0000" state before any services can be activated. This resetting is accomplished by the pressing of reset switch 68. Because this reset switch is located behind the door panel 22, it becomes necessary for authorized personnel to first unlock and open the panel door and then to press the reset switch.

Thus, it is seen that the service panel with utility controller of the present invention provides a practical means of controlling the various services needed in a science classroom while providing a high level of security and safety for the students that occupy the classroom. Further, the presence of the panic button ensures that in the event of an emergency, an alarm can be sent and because the reset button is located within the secured service panel, any emergency will not go unnoticed.

The "EMS" feature is an assurance that the service panel with utility controller can only be activated during pre-specified times. Typically, the "HVAC" in school buildings are monitored and controlled by an "EMS". These "HVAC" systems are activated just prior to the commencement of the school day and deactivated at the end. The same signal used to activate the "HVAC" likewise enables the utility controller. However, the utility controller has an added safety feature. "HVAC" should turn ON and OFF on command. The utility controller is designed to be activated only by demand. For instance, if one control switch on the door panel is left in the ON position at the end of the classroom day, a deactivate signal from the "EMS" will deactivate the utility controller thereby deactivating the service panel. However, assuming that the next active interval is one hour prior to the commencement of classes, then the "HVAC" would be energized or become active. But the service that was left in the ON position would not likewise become active. This is due to the design of the source code of the electronic controller. It will be appreciated from the state controller diagram of FIG. 4, a deactive signal from the "EMS" returns the logic program to the "0000" state. In this state, it is necessary to re-energize the controller by inserting the key into the keyed switch and turning it to the ON position. In this described situation, the classroom instructor would learn that a control switch was left in the ON position because the lower indicator would be illuminated.

There may be instances where a school building does not have a fire alarm system. Because the design of the electronic controller is such that this is permitted, the service panel with utility controller will function properly. All controlled services will be deactivated by the pressing of the panic button and the panel will require a reset before it becomes active, only an alarm signal will not be sent.

Further, if desired, by building design that the panic button assembly be committed, then its absence will have no adverse affect in the operation of the service panel and utility controller. In such a case, the ability to deactivate the service panel by pressing a panic button will be denied. However, in some instances, building design that a panic button assembly be field-mounted in a remote location but still connected to the service panel necessitates it. This remotely-located panic button when connected to corresponding pins at door panel plug 88 will readily be integrated into the system just as though it were an integral part of the service panel and utility controller.

Though the services described are the most commonly used services in school science classrooms, it should not be construed that the use of the invention be limiting in scope. For example, any gaseous or liquid service can be controlled. As discussed above, three (3) services may be controlled in the service panel 1. The services may include a gas cut-off assembly, and two (2) water cut-off assemblies, one that provides cold water to the science room while the other provides hot water. However, by simply enlarging the service panel, a fourth or even a fifth cut-off assembly can be easily added. A virtually unlimited number of services can be controlled by the utility controller. These added assemblies can control services such as oxygen or nitrogen. Control wiring is field-installed from a remotely-located utility controller (not shown).

Also, because the electronic controller is modular in nature, a series of service panels can be electronically linked so as to provide controlling service to a seemly unlimited number of individual services.

Another embodiment of the invention enables in-the-field modifications of the operating configuration of the system of this invention. Additionally, auxiliary and remote circuits can be added, thus enabling the control of various apparatuses such as exhaust fans, fume hoods, etc. For example, these auxiliary circuits can serve to activate exhaust fans for the purposes of purging an area during an emergency. Another embodiment includes a radio frequency "RF" handheld remote control which permits the user to activate and deactivate the various circuits from a remote position. According to still another embodiment, the separation of the utility controller from the controlled devices is advantageously exploited to allow even greater flexibility. Components of the system in the following discussed embodiments, which are the same as in the preceding discussed embodiments, will be identified by the same reference numbers.

Figure 11:
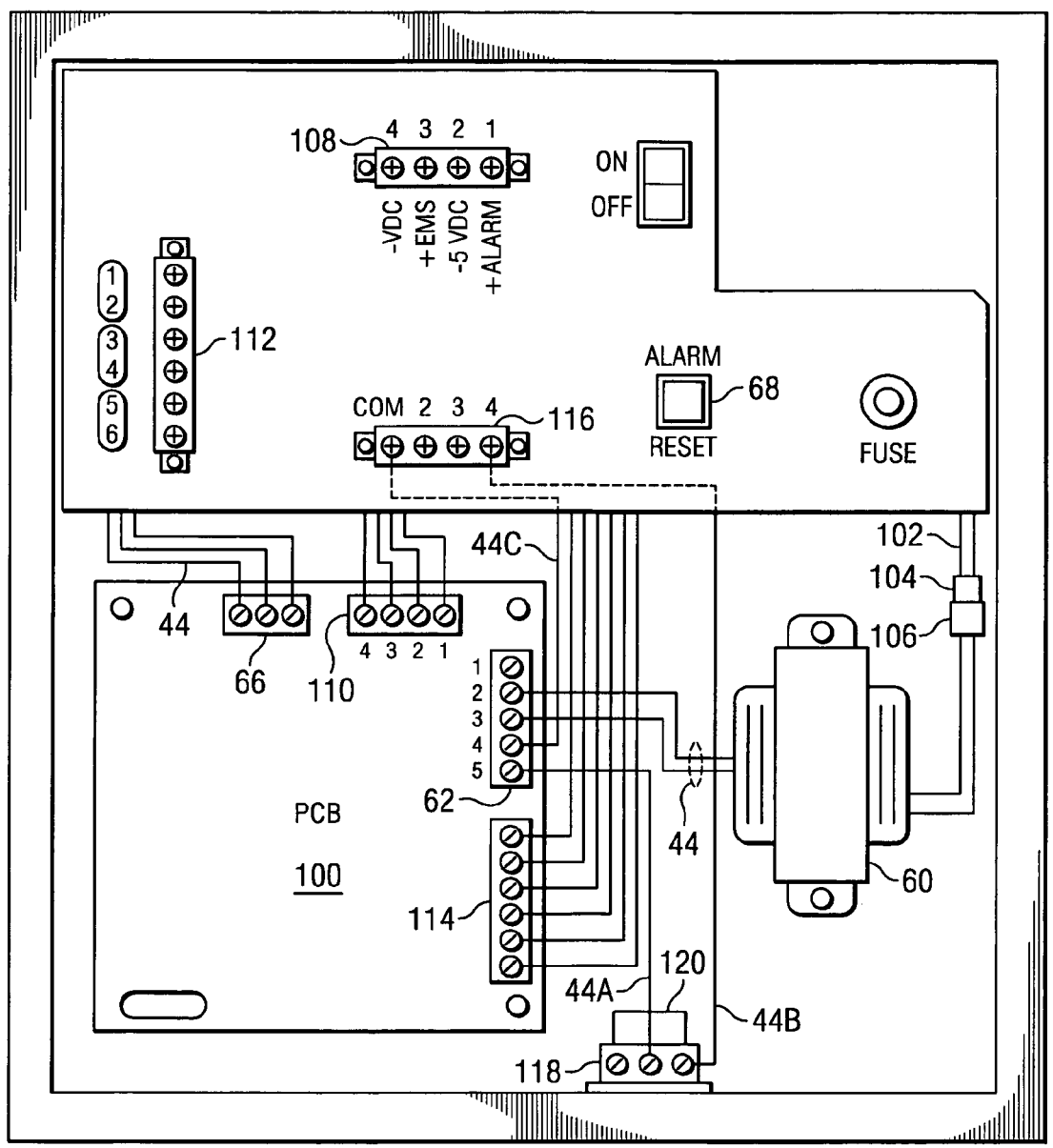
FIG. 11 illustrates alternate embodiments of a utility controller according to the teachings of the present invention.

Referring now to FIG. 11, the component layout and wiring configuration of the utility controller of this invention is generally discussed. A more detailed discussion of the various features of the utility controller is included hereinafter. As shown, low voltage transformer 60 is advantageously located adjacent to electronic controller printed circuit board "PCB" 100. Line voltage (such as for example 110V) wiring leads 102 terminate at transformer socket 104, which is connected to mating transformer plug 106. Low voltage wiring from the reset switch 68 is connected to reset terminal 66 in the same manner as discussed above with respect to FIGS. 3A and 3B. Wiring from integrated systems terminal 108 is terminated at integrated systems connector 110 on PCB 100. Alarm outputs may, for example, be connected to posts 1 and 2, and an "EMS" (Energy Management System) input may be connected to posts 3 and 4 of system connector 110. Wiring from the output terminal 112 terminates at output connector 114 on PCB 10.

Low voltage wiring 44 from the transformer 60 is connected to power terminal 62 on the power controller PCB 100. Low voltage wiring for the auxiliary terminal 116 originates at pin 5 on terminal 62, and is connected to output terminal 118 at pulse relay 120 by wire 44A. The pulse relay 120 is mounted onto a printed circuit board and positioned at the base of the enclosure. A second lead 44B extends from the output terminal 118, which is connected to the normally opened terminal of relay 120, and terminates at one of three output posts at terminal 116. Low voltage wiring 44 also originates at post 4 of terminal 62 and is routed to the common post (1) at auxiliary circuit terminal 116. Integrated systems, output circuits, and, if applicable to the configuration, auxiliary circuits may be in-the-field connected to terminals 108, 112, and 116 respectively.

Figure 12:
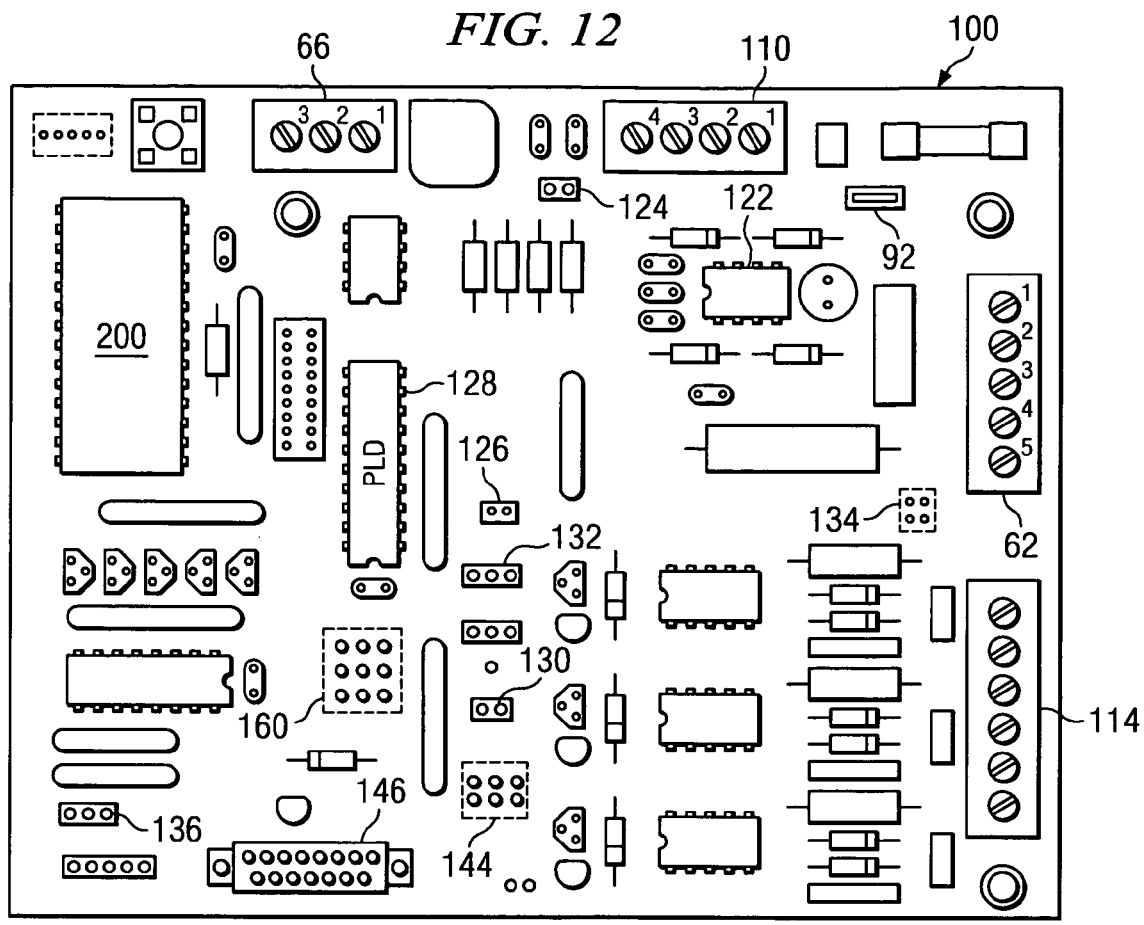
FIGS. 12, 12A, and 12B illustrate one embodiment of the full PC board and enlarged portions respectively used with the utility controller of FIG. 11.

FIG. 12 is a representative image of printed circuit board "PCB" 100 according to one embodiment, and illustrate locations on the board of the various components. For example, although these features will not be discussed further, there is included a connection for a 5 VDC output for use by the operator of the controller for in-the-field connections for various add-on components, as well as a connector that permits additional 5 VDC and ground outputs. As will be discussed later, there is also included a connector for future integration of a secondary control device to be integrated with the system such as an input from an alarm system.

As mentioned above, the enhancements of this embodiment enables in-the-field modifications to the operating configuration of the device. For example referring to FIG. 12, the optical isolator 122 is an AC "alternating current" style so as to permit both 5 VDC and 24 VAC "EMS" enabling signals. Jumper terminal 124 allows input connections to both resistors. Dependent upon the requirements of the desired setup, a jumper may be provided across jumper terminal 124 to change the resistive value to the input signal for the two independent signals. For example by placing the proper jumper across selected pins on jumper terminal 124 configures the PCB 100 for 5 VDC or VAC input while omitting it configures it for 24 VAC "EMS" input. The following paragraphs briefly describe other in-the-field modification.

The two posts on jumper terminal 126 enable the user to configure how the reset switch 68 functions after a panic state has been initiated. By placing a jumper across the appropriate posts on jumper terminal 126, the door panel keyed switch, like the reset switch will advance, the "PLD" (Programmable Logic Device) 128 from the panic shutdown state "1111" as shown in FIG. 4 to the shut-down, but active state "0000". Omitting the jumper configures the controller so that reset from the panic state must be initiated within the enclosure at the reset switch.

Connector 130 permits another remotely-located panic button assembly which is wired to the PCB 100 to be integrated with the system. Pin 1 routes ground to the remote panic button assembly, and returns a ground signal to pin 2. Thus, as will be discussed later, by pressing the remotely-located panic button, the controller logic is advanced to the panic state in the same manner as pressing the panic button on the panel assembly.

Jumper connector 132 enables in-the-field configuration of the operation of the panic button on a hand-held remote operator. Placing a jumper across the left two posts configures the remote panic button operation to activate the panic state, thus providing an output alarm signal. Placing the jumper across the right two configures the operation to reset "EMS" only, thus disabling all output circuits without sending alarm.

Figure 12A:
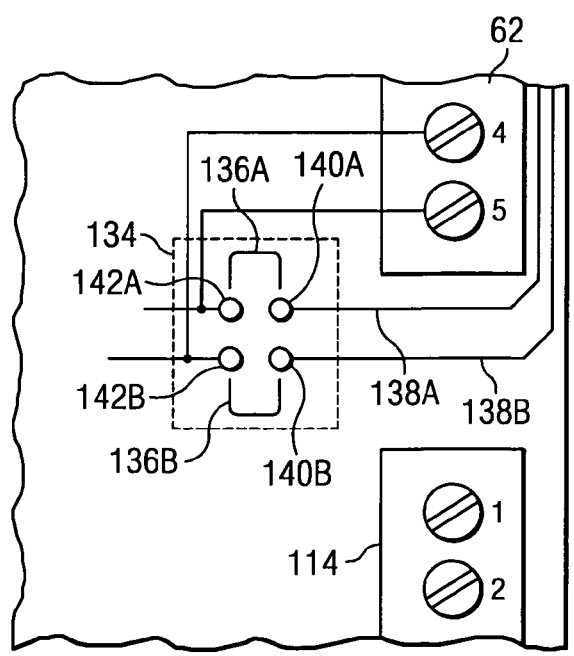

Also as shown in area 134 of FIG. 12, and more specifically in the enlarged view of FIG. 12A, jumper wires may be connected (typically soldered) so that only two of the four available input posts at power terminal 62 are used to provide input and operating power. Low voltage wiring is thus routed through tracings on the PCB 100 to both the load and the power supply. This feature enables wiring for the auxiliary output terminal to be readily connected to the 24 VAC power source. As shown in FIG. 12A, two jumper wires 136A and 136B connect the two points in the wire tracings on the PCB 100 at terminal 62. The wire tracings 138A and 138B originate at posts 2 and 3 of terminal 62 (not shown) and terminate at terminals 140A and 140B. Also as shown, tracings from pins 4 and 5 of terminal 37 terminate at posts 142A and 142B.

Figure 12B:
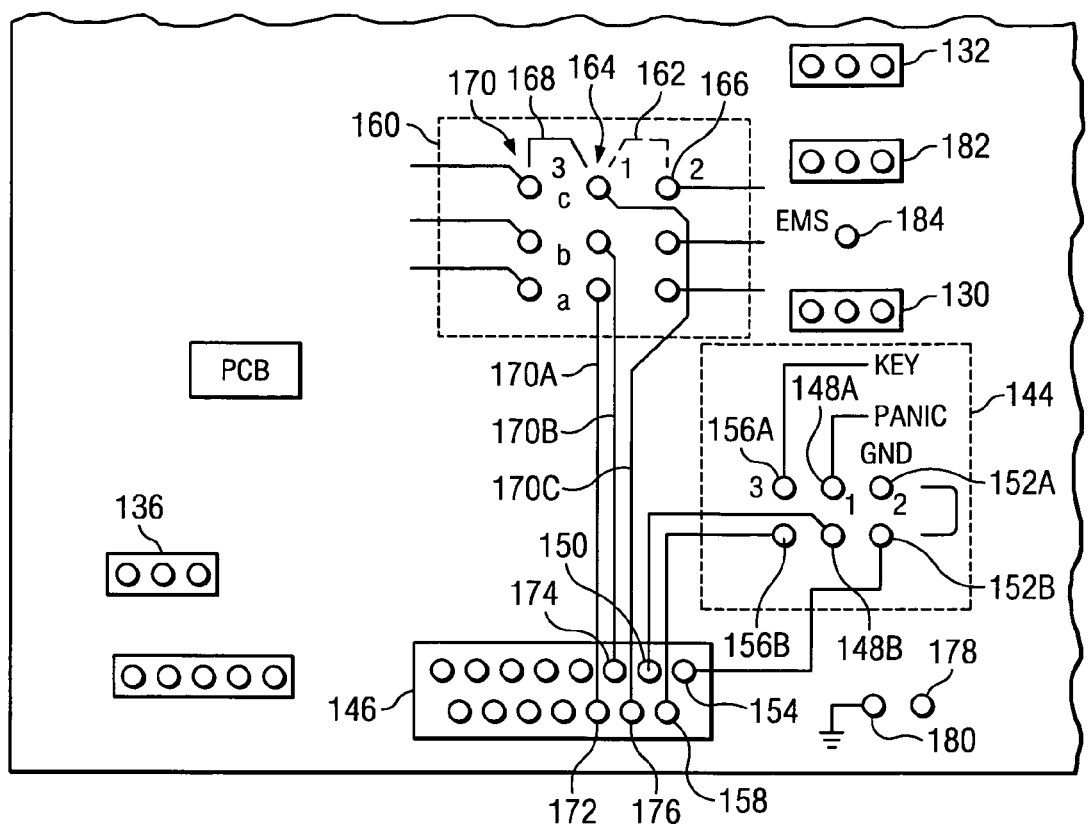

As shown in FIG. 12B, the selective use of jumper wires in area 144 enables control wiring from the door panel wiring harness connected to the door panel plug 146 to be configured for different purposes. As an example, omitting a jumper wire across terminals 148A and 148B opens the circuit going from pin 150 on plug 146 to the panic input on the PLD (Programmable Logic Device) 128 (not shown in FIG. 12B). This will enable the wiring within the door wiring harness to be connected to an auxiliary control switch rather than a panic button, in instances where the panic button assembly is omitted on the door panel. Similarly, omitting a jumper wire across terminals 152A and 152B opens the circuitry to the second ground provided at pin 154 on plug 146 and thus to the door panel assembly. This will enable the second ground wire within the door wiring harness to be connected to an additional auxiliary control switch, in instances where either two auxiliary circuits occur, or where a single auxiliary circuit plus the panic button located on the door panel. Thus, at the door panel, ground connections for all switches would originate from a common ground pin. Also as shown, omitting a jumper wire across terminals 156A and 156B breaks the connection from pin 158 on plug 146 for the key switch 36 on the door panel assembly. Thus, with this arrangement, when the utility controller of this invention incorporates the radio frequency remote control feature as discussed below, two auxiliary circuits plus the panic button on the door panel may be enabled, while omitting the keyed switch.

As also shown in FIG. 12B, the use of jumper wires in area 160 enables the PCB 100 to be configured for standard or "RF" (radio frequency) operation. Jumper wires 162, shown as dashed lines from the center column of posts 164 to corresponding right hand column of posts 166, configure the system for standard operation, while the wires 168, shown as solid lines connected between the center column of posts 164 and the left hand column of posts 170, further enable the radio frequency circuitry to operate the door panel control switches. From plug 146, tracing 170A from pin 172 terminates at 164A (tracing 170B), from pin 174 terminates at point 164B (tracing 170C), and from pin 176 terminates at point 164C. Since the key switch and panic circuitry are intended to operate at either the door panel or by hand-held remote when the system is configured for panic and key operation, as illustrated at area 144 in FIG. 12C, jumpers in area 160, as discussed above, will not be necessary.

FIG. 12B shows the wiring interconnected points on the PCB 100 between these strategic locations and the pulse relay to enable the pulse relay to perform various optional functions. For example, +5 VDC control power is provided at terminal 178, and ground is provided at terminal 180. The enabling signal for the key switch is provided at terminal 182. This point is integrated with the door panel key circuit so that the key switch on the door will activate the pulse relay circuit. The "EMS" signal is provided at terminal 184, and provides "EMS" shut-down of the pulse relay circuit when the "EMS" signal is withdrawn. The switch signal at terminal 152B is integrated at the PCB to the door panel so that an added control switch on the door will activate the pulse relay circuit. Terminal 148B provides a panic switch signal, but only when the panic button 38 has been omitted at the door panel and the jumper between terminals 148A and 148B is omitted. The alarm signal triggers the pulse relay for a purge or emergency exhaust configuration. Additional explanation of the uses of these terminals is discussed in the pulse relay descriptive portion of the specification.

The following discussion concerning the design and operation of the radio frequency circuitry of the PCB 100 will illustrate not only its function but also how the omission of components intended for use only when radio frequency is employed will not affect the operation of the PCB when configured for standard operation.

As discussed, adding selected components to the PCB 100 enables remote operation of the system using radio frequency. A five-button hand-held control allows activation and deactivation of the controlled services and also includes a panic button.

Figure 13:
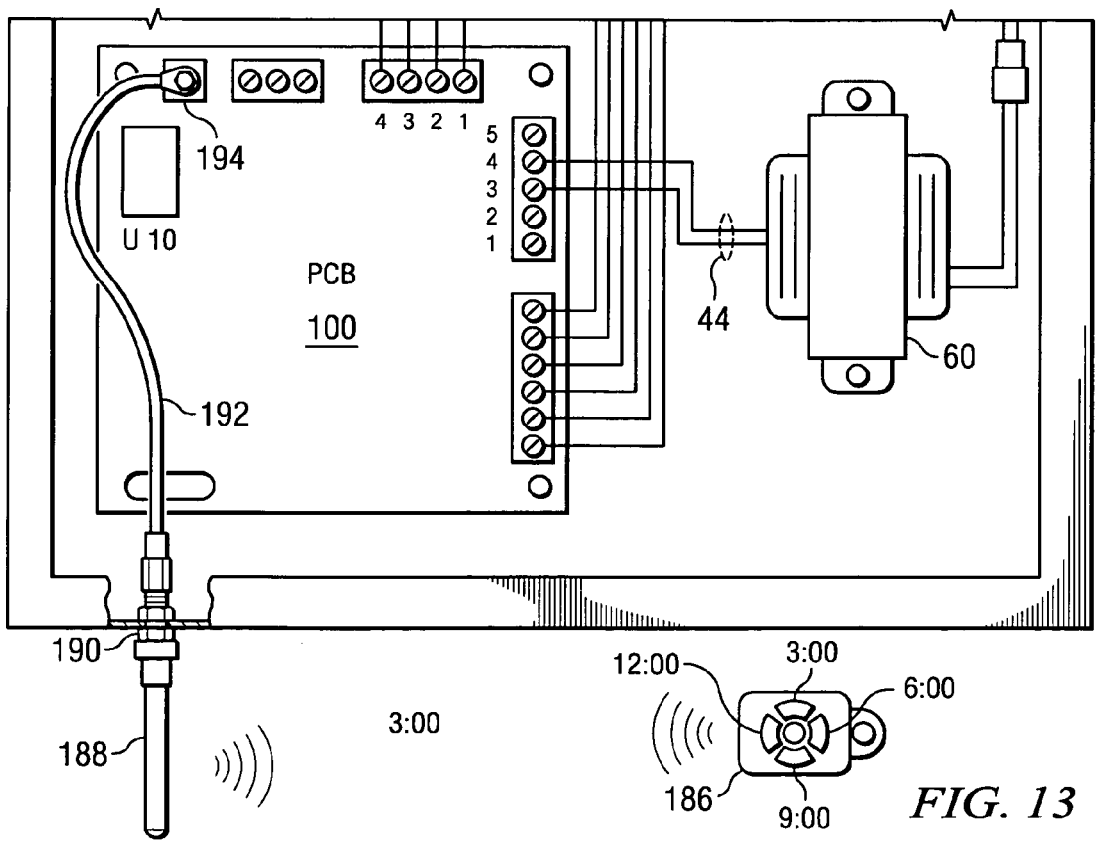
FIG. 13 generally illustrates an embodiment of the invention that includes a remote transmitter and associated circuitry.

As illustrated in FIG. 13, reception of radio transmitted control signal from hand-held control 186 is accomplished through half wave antenna 188. The antenna is mounted exterior of the utility controller enclosure at the bottom surface, and is affixed with bulk-head fitting 190. Coax cable 192 extends from this fitting to connector 194 on PCB 100.

Hand-held controller 186 includes five buttons arranged in a circle, with four of them at the 3, 6, 9, and 12 o'clock positions, and the fifth in the center. The buttons located at the 9, 12, and 3 o'clock positions allow deactivation of the corresponding utility (circuit 1, circuit 2, circuit 3), and the button at the 6 o'clock position is the Key Switch input. The button located in the center is the Panic input. It is noted that a circuit may only be remotely turned "ON" if the Service Control Switch on the door panel is also in the "ON" position. Thus, when the remote Key Switch button is depressed, only the circuits that have the Service Control Switches on the door panel in the "ON" position will be activated. The particular arrangement of the five switches discussed above is, of course, only an example and the various functions could be assigned to any of the five switches as selected by the user.

Figure 14:
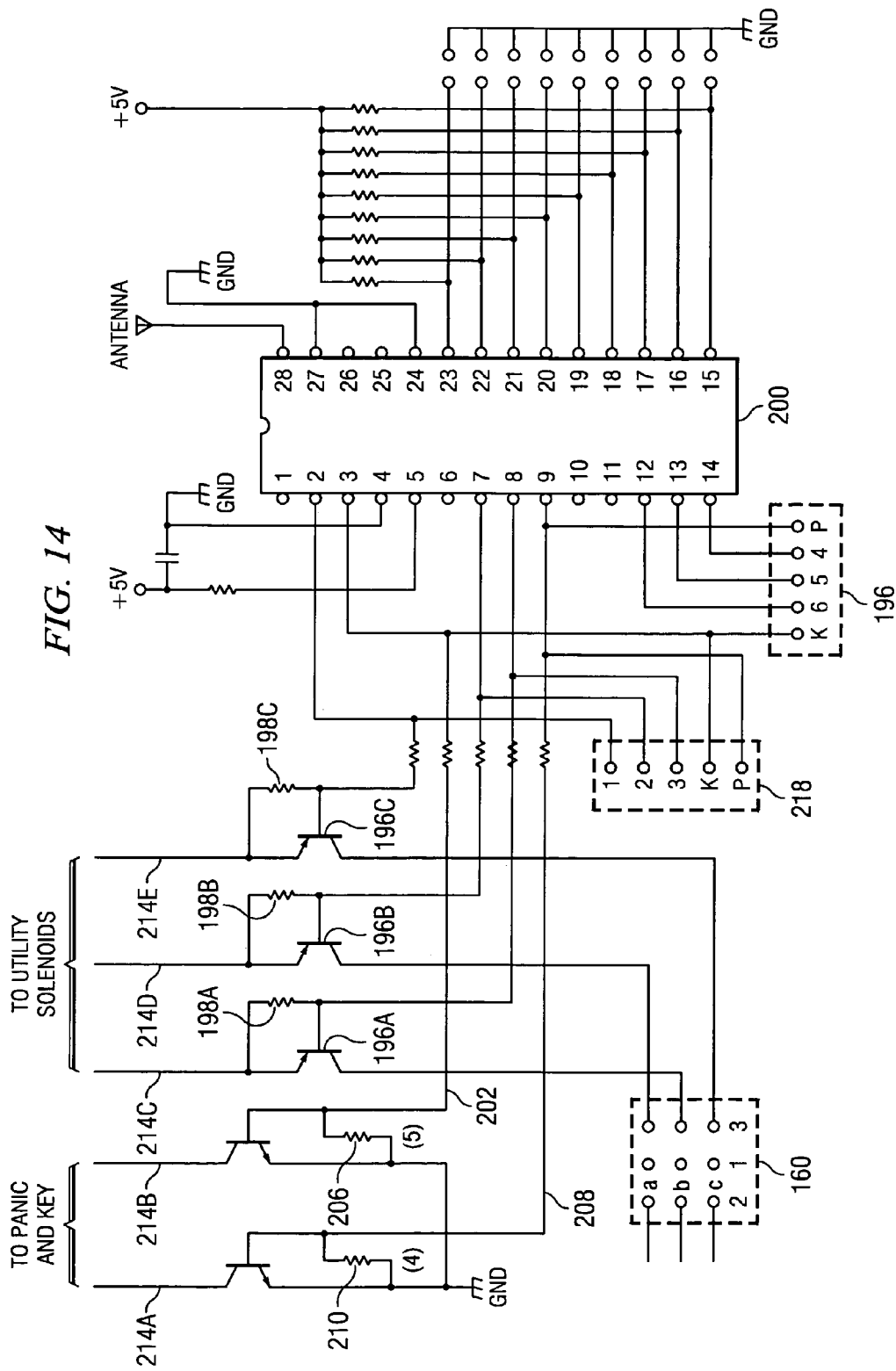
FIGS. 14 and 15 are various circuit diagrams present on the PC board of FIGS. 20A and 20B.

As illustrated in the wiring schematic FIG. 14 for the RF portion of the PCB 100, the RF decoder outputs are effectively connected in series with the door panel control switch inputs so operation can be controlled by either the switches or the RF controller. Turning either the door panel control switch "OFF" or activation of the corresponding RF switch turns the appropriate transistor 196A, 196B or 196C off which allows the corresponding pull-up resistor 198A, 198B or 198C to take the signal to the logic device 200 high, which in turn switches the utility "OFF".

When the door panel key switch 36 is engaged or upon receipt of the appropriate RF command the input 202 to the logic device 200 is connected to ground. When released, the pull-up resistor 206 returns the signal to a logic high level. The panic switch works in the same way, pushing the panic button or activating the RF transmitter causes a momentary grounding of the input signal on wire 208, and releasing the button allows the pull-up resistor 210 to return the signal to a logical high state.

As discussed above, the user pre-sets the desired utility services or circuits to be enabled by turning on the appropriate Service Control Switches on the door panel. When the key button on the hand-held control is pressed or the door panel key switch is turned to the "ON" position, the PLD 128 will advance to the appropriate state and turn on whichever utilities had their Service Control Switches set to the "ON" position. Turning "OFF" any Service Control Switch that had been previously activated will disable the specific circuit. Likewise, pressing the corresponding button on the hand-held control will disable the circuit. Pressing the key button on the hand-held control will again re-enable the circuit.

The system uses an RF receiver chip with built-in decoder. The decoder can be selectively set to one of a large number of different addresses, (according to one embodiment, 512 addresses are available). The different utility controllers within a building or area are individually addressed. Therefore, a hand-held controller for a particular system would transmit an address set to the same code as the receiver. Thus, a hand-held controller in an adjoining room or area is prevented from changing the state of a nearby utility controller unintentionally. Jumpers at jumper terminal 124 shown in FIG. 12, are either set or removed to program the appropriate address at the RF decoder portion of logic device 200. The hand-held controller uses internal circuit traces that are opened or separated to program the appropriate address.

The RF receiver/decoder outputs an un-buffered active high signal when the address matches the one used on the hand-held control. This active high signal is buffered on the utility controller or PLD 128 by external pass transistors, which operate as switches. As discussed above, for the three circuits being switched, the appropriate transistor opens a connection to ground when activated, and for the Panic and Key Switch inputs the signals are connected through the transistor to ground. For this reason both NPN and PNP transistors are used. PNP transistors are used when the active output of the RF decoder needs to open a grounded connection, and NPN transistors are used when the active output needs to generate a grounded signal.

FIG. 14 further discloses area 160 that corresponds to the area 160 as illustrated and described in FIG. 12B. Wires 214a, 214b, 214c, 214d and 214e of this diagram correspond to wires having the same reference numbers as the schematic FIGS. 15A and 15B for the logic/input portion of the PCB. Also, areas 216 and 218 are shown. Area 218 does not appear in FIG. 12 because the RF component 200 conceals it from view. These connection terminals along with the terminals in area 216 enable expansion of the RF capabilities of the controller by an additional three control circuits.

For example, there presently exists hand-held controllers capable of communication with the RF receiver which have eight total or three additional key buttons more than the five buttons shown in FIG. 13. The embodiment of the PCB 100, as discussed above, includes only three designated output circuits. This, of course, would limit the number of utilities that can be controlled to three. However, integrating or interconnecting two PCB boards enables additional circuits to be controlled by the RF circuitry.

Figure 15:
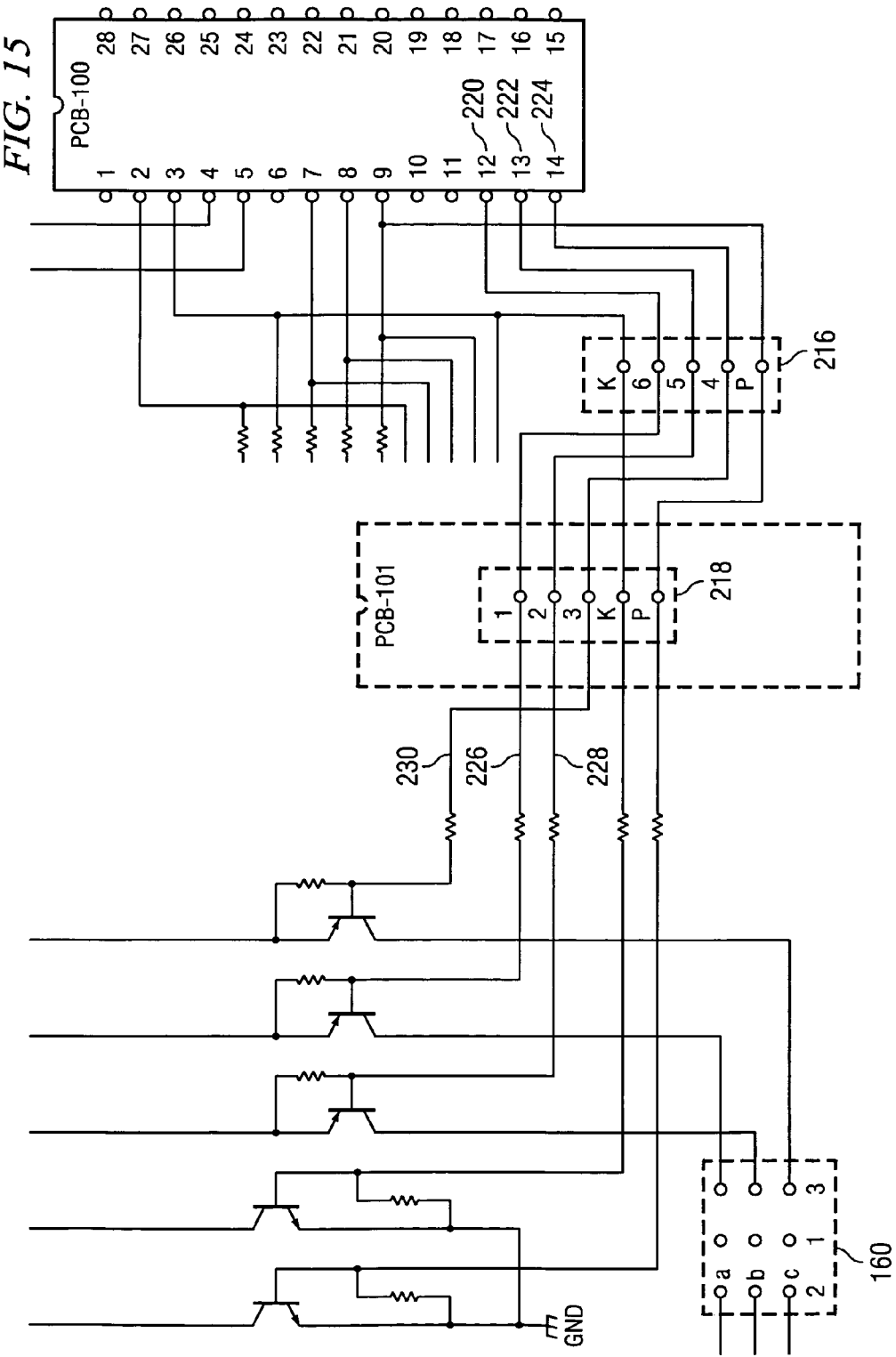

As illustrated in FIG. 15, providing interconnecting wiring between area 216 on the primary board, PCB 100 to area 218 on the secondary board, PCB 101 enables the additional three buttons on the hand-held control to operate the three output control circuits on the second board. It is also noted that the step of interconnection permits the omission of many of the components on PCB 101 that are incorporated into the RF circuitry of PCB 100. That is, though not fully illustrated in the figure, all components including RF logic circuitry 200 as discussed and illustrated in FIG. 14 are present on PCB 100 in FIGS. 14 and 15, while PCB 101 only includes those items or components in FIG. 15 that are shown.

The additional outputs 220, 222, and 224 from RF logic circuitry 200 on PCB 100 are connected respectively to the circuits 226, 228 and 230 on PCB 101. Since key and panic operation is common with both boards, these wiring configurations are in parallel as shown. Another method to provide the logic control for the utility controller is by using discrete logic gates and flip-flops.

The clock for the utility controller is synchronously divided down to a reduced frequency by the internal clock divider circuitry. Four clock phases are then derived, with each of the three utilities having its own clock phase during which it may change state. This prevents the simultaneous switching of multiple inductive loads. The fourth phase is used to clock the circuitry relating to the "Panic" & "EMS" functions. What this means is that if an EMS condition or a panic condition requires multiple utilities to shut off at the same time, they are actually sequenced in their shutdown by the four phases of the clock. The phases are as shown:
 1. Circuit 2 control
 2. Circuit 1 control
 3. Panic & EMS
 4. Circuit 3 control Referring now to FIG. 16, there is shown a wiring schematic of the pulse relay circuit board. The pulse relay facilitates the use of the auxiliary and remote circuits of the invention as discussed above. The pulse relay can be integrated into the wiring configuration of the utility controller to enable multiple auxiliary and remote circuits, which can be controlled by the device. Although not used in a configuration where the pulse relay provides control of an auxiliary or remote circuit of the utility controller, full-wave bridge rectifier 232 and voltage regulator 234 are available for providing regulated 5 VDC power from a 24 VAC power source.

Figure 16:
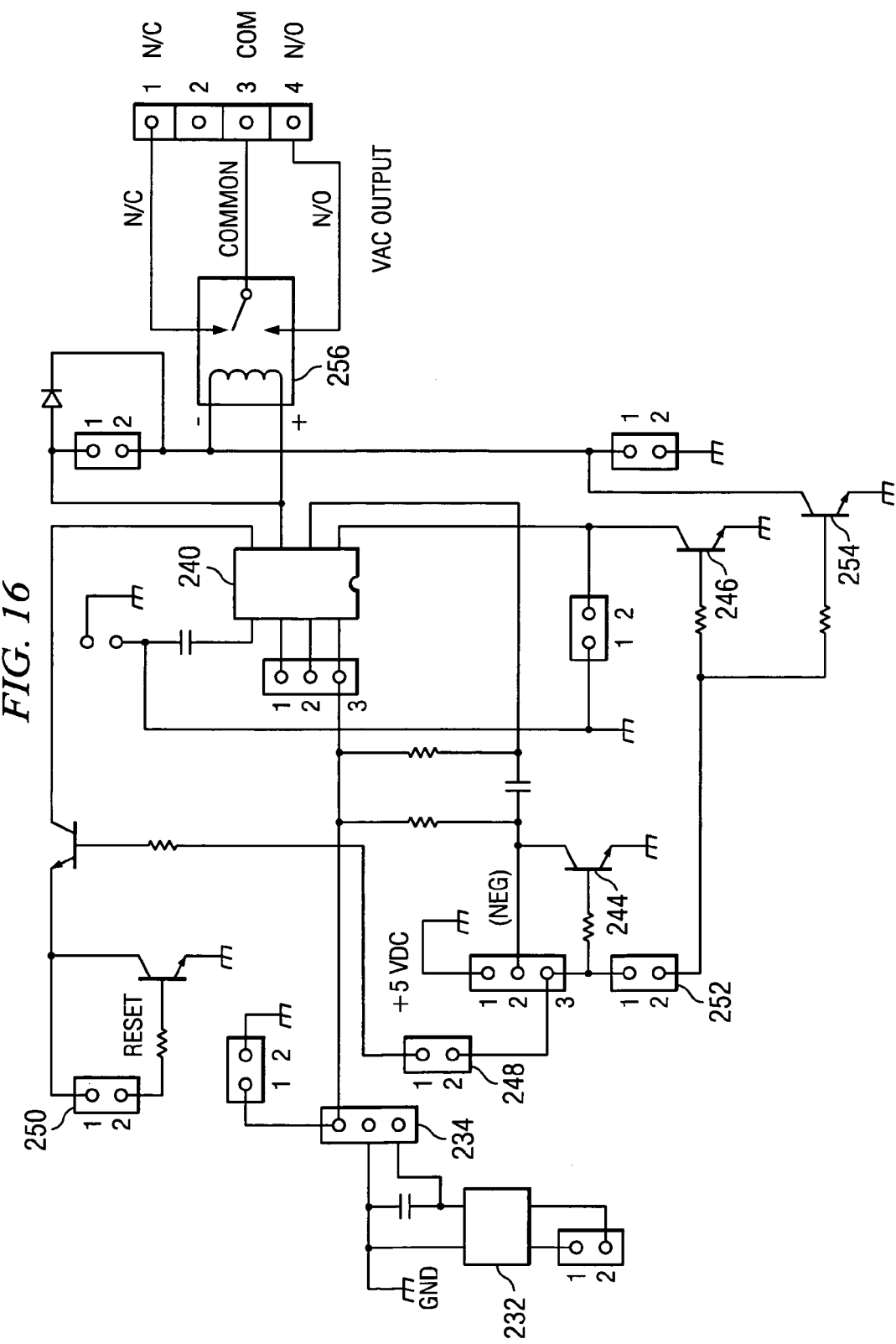
FIGS. 16, 16A, 17A and 17B are circuit diagrams illustrating how the placement of various jumpers and connecting wires may be used to program the utility controller to operate according to different requirements.
Figure 16A:
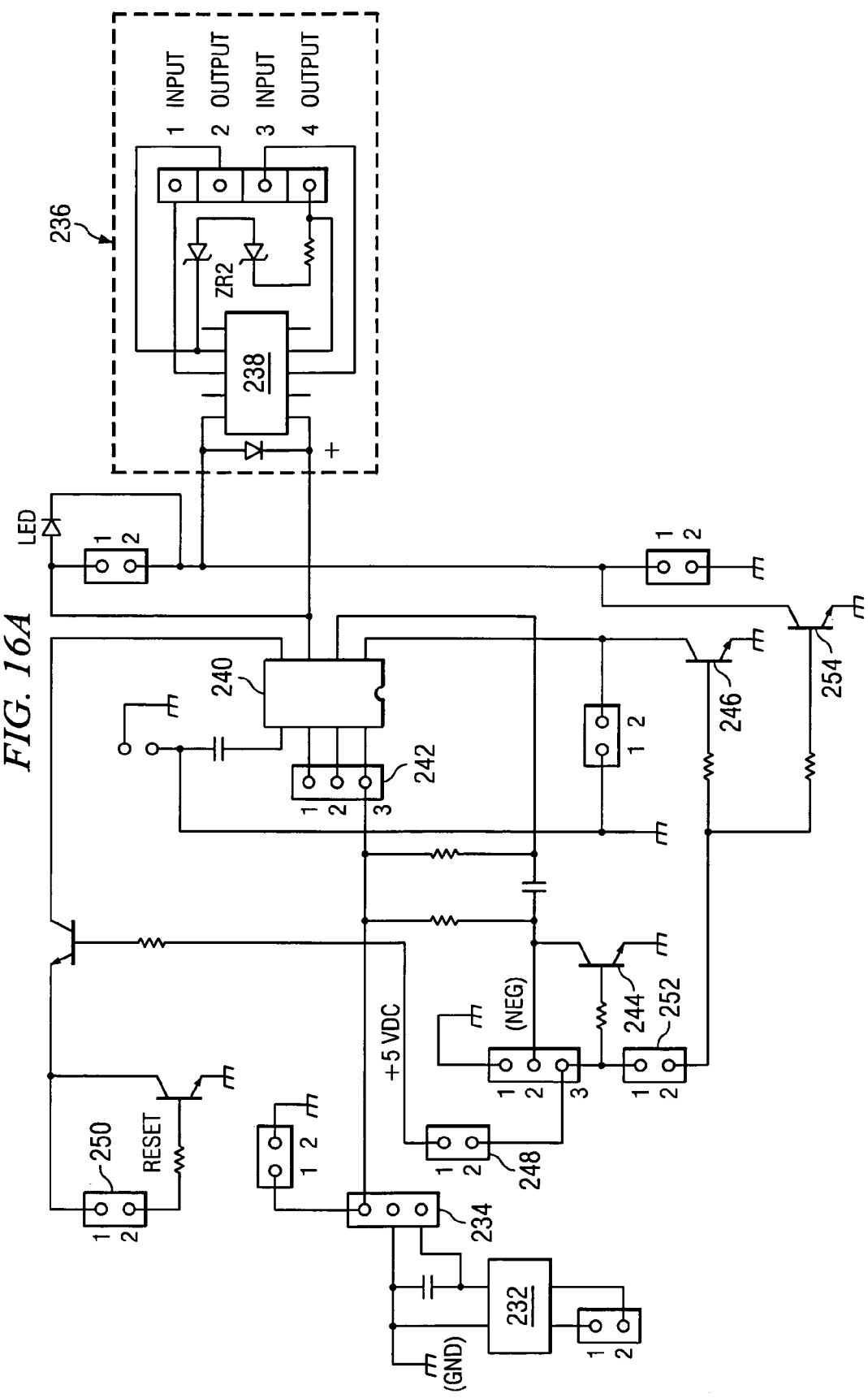

FIG. 16A is similar, except that in this configuration of the pulse relay, snubber circuitry 26 along with a double pole relay 238 replaces the relay in FIG. 16. The snubber circuit 236 protects relay 238 from over-voltage due to accumulated energy in the wiring inductance of the circuit when the relay contacts open.

The pulse relay utilizes a timing device 240, such as a common timer. In this configuration, the pulse relay however overlooks the timing function typically associated with this type of timer device. Avoiding the threshold and discharge pins located at jumper terminal 242, the timer functions as a trigger ON-reset OFF device. A control signal triggers the timing device 240, and a reset signal from control wiring resets the timer.

Thus, it is seen that the "pulse relay" operates somewhat similar to a "latching relay". However, unlike a true latching relay that requires current to latch and then unlatch, the pulse relay operates such that either a pulse trigger or a loss of power will unlatch the relay. As mentioned above, a timing device and a normal electrically held relay are combined to accomplish this. A pulse "ON" signal triggers the timing device and provides operating current to the relay. A trip "OFF" signal to the timing device terminates the operating current.

Also, unlike a true latching relay that depends upon a true pulse "OFF" signal to unlatch, withdrawal of current to the timing device will deactivate the relay. This is different than typical applications of a latching relay wherein the loss of control or operating power while the relay is latched (and even if regained) results in the relay remaining latched until a control "OFF" signal is received by the relay.

This feature not only enables a positive shut-off with loss of any control power, but also permits the manipulation of the wiring configuration as described above for several types of switching configurations.

A primary configuration of the pulse relay of FIG. 16 or 16A permits the output circuit to operate an exhaust fan. As can be seen in these figures, NPN transistors 244 and 246 along with jumper terminals 248 and 250 permit either +5 VDC or ground to either trigger or reset the timing device. Placing a jumper across the pins at jumper terminal 252 along with a +5 VDC signal from a panic button arriving at jumper terminal 248 will drive transistors 244, 246 and 254 to ground, enabling the pulse relay when in any present state to engage, thus activating a purge sequence for the fan. Relay 256 provides load control for the output circuit.

Figure 17A:
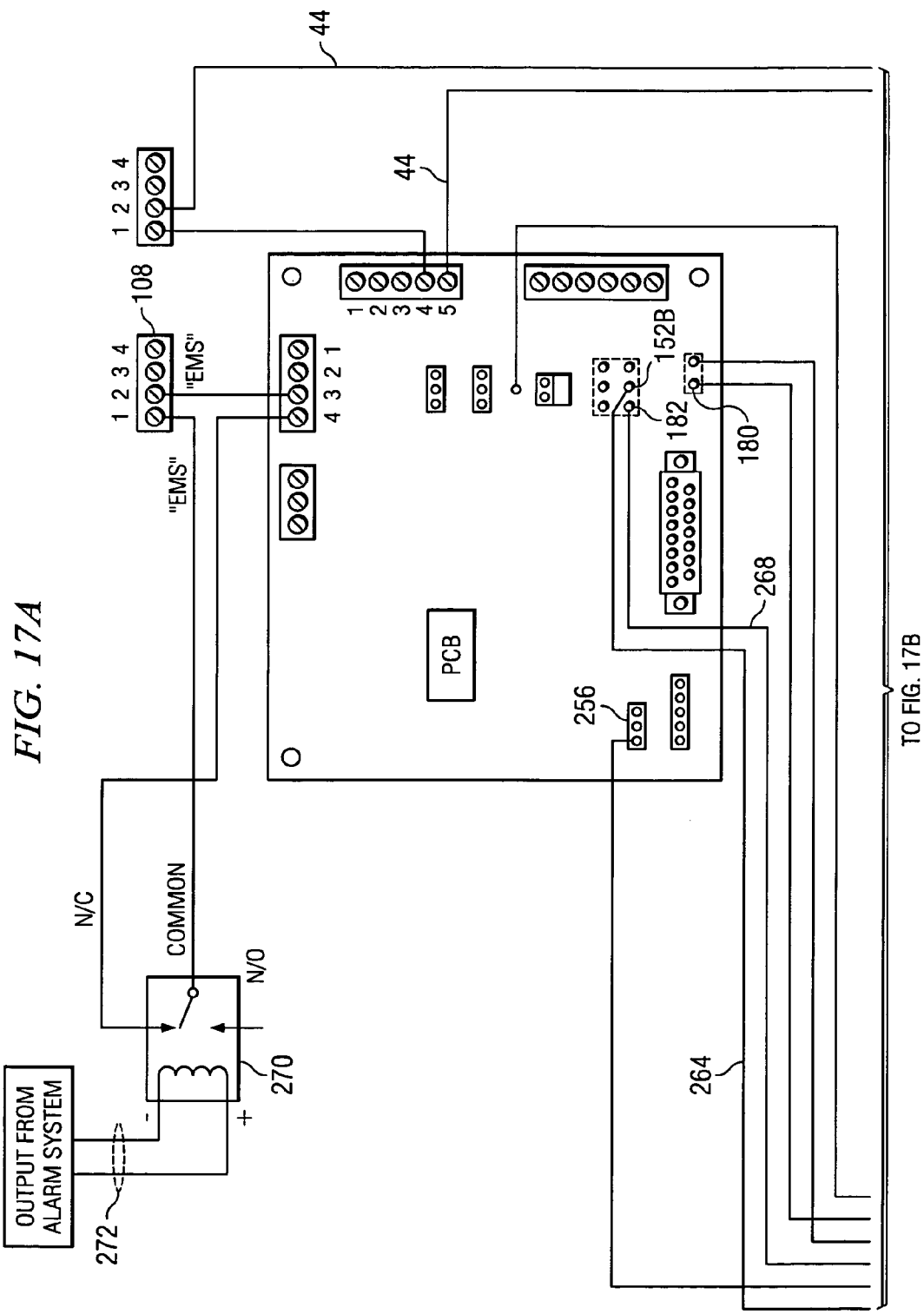
Figure 17B:
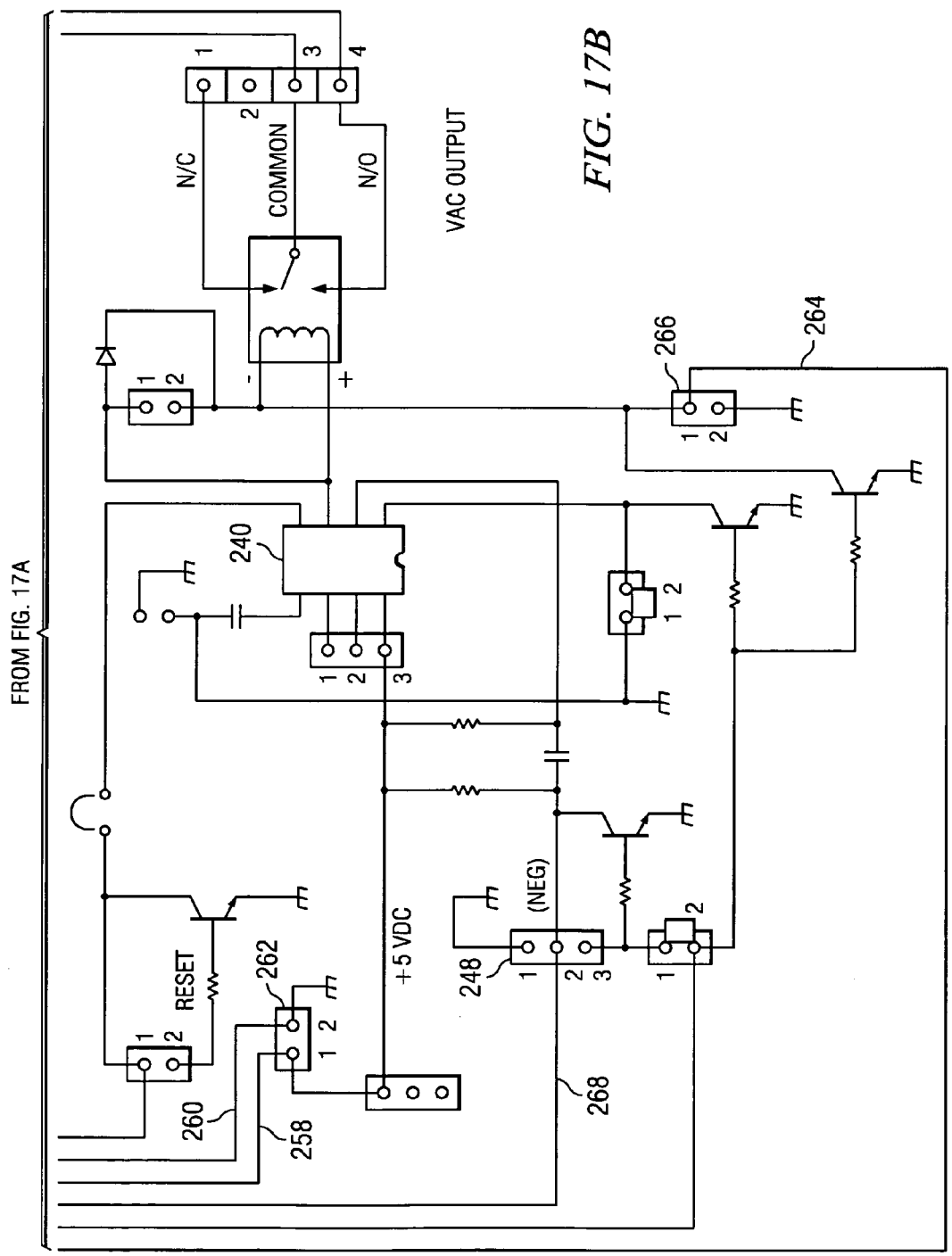

Referring to FIGS. 17A and 17B, a description of such a primary configuration of the pulse relay follows. Components of the pulse relay not required for this configuration are not shown. A +5 VDC and ground are provided at terminals 178 and 180 as shown in FIGS. 17A and 17B and is provided through wires 258 and 260 to pins at junction terminal 262. A signal from a control switch for an output circuit is provided at terminal 152B and is routed through wire 264 to a pin of jumper terminal 266. A signal for the key switch circuit originates at connection 182 and is routed through wire 268 to a pin of jumper terminal 248. The path of the input "EMS" signals through the normal closed pins of auxiliary relay 270 and the connection of integrated output wiring 272 from an alarm system is shown in FIGS. 17A and 17B. An alarm disrupt signal generated from that system would open contacts at the relay thus interrupting the "EMS" signal which in turn interrupts the system operation. As illustrated, "EMS" wiring passes from integrated systems terminal also shown in FIG., through these closed contacts of relay 270 then to integrated systems connector.

Also as shown, low voltage wiring 44 originating at controller power terminal 62 is routed through common terminal at pulse relay 120, output terminal 110, and then through the output of relay 120 to terminal block 110 and finally to termination at a pin of auxiliary output terminal 116. As shown on the drawing, a jumper is placed across jumper terminal 234 to provide a constant ground to timer 240. Thus, upon receiving a first key signal, timer 240 triggers "ON". Therefore, after the first key "ON" signal, the pulse relay can be made active or inactive by opening or closing of an auxiliary switch routed from terminal 132B to jumper terminal 266. A +5 VDC panic signal arriving at jumper terminal 276 and routed through wires 278 to jumper terminal 252 will switch transistors 244, 246 and 254. Transistor switch 226 has no impact on the device since ground is constant to timer 240. However, switching that occurs at transistor 244 and 254 respectively will 1) activate timer 240 in cases where first keying has not occurred; and 2) energize relay in the event that the controlling auxiliary switch is "OFF".

A –5 VDC or ground "EMS" signal arriving at terminal 184 and routed through wire 280 to jumper terminal 250 will reset timer 240 by providing a ground signal. Thus, at the end of an "EMS" cycle, the circuit controlled by the pulse relay will become inactive.

The basic operating sequence of this configuration where the circuit is an exhaust fan is 1) the fan will only become enabled after a first key switch signal. Thereafter the circuit opens and closes by a switch; 2) the fan will always be enabled upon any panic occurring during occupied periods; 3) the fan will always be disabled at the end of occupied periods; and 4) the fan along with all other output circuits will be disabled upon receiving an input from an integrated alarm system.

Other configuration examples of the pulse relay for use as control circuitry for auxiliary and remote circuits are possible and discussed as follows:

Connecting wire 264 to jumper terminal 274 and moving the jumper to jumper terminal 266 forces keying each time the circuit is enabled by the switch.

Omitting wire 268 and connecting wire 264 to jumper terminals 248 and 274 and providing a jumper at jumper terminal 266 allows switching to always be set to "ON".

Omitting wire 264 and connecting wire 268 to jumper terminal 248 and providing a jumper at jumper terminals 266 and 274 results in an "ON" condition at first keying for remote circuits where switching of circuit is performed external of the controller.

Removing wire 278 prevents an alarm from activating the circuit

Removing wire 280 prevents the loss of an "EMS" signal from deactivating the circuit.

Another embodiment of the invention permits much more ease in retrofits of the device, and would typically be used where a facility desired to upgrade the control of the utilities.

Figure 18:
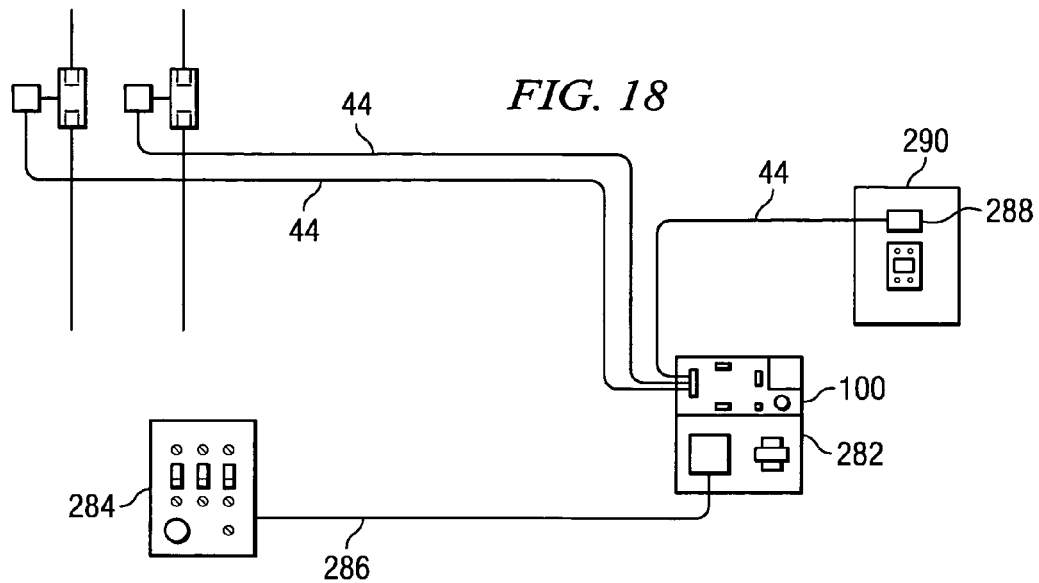
FIGS. 18 and 18A illustrate arrangement of another embodiment of the system of this invention wherein the utility enclosure is located remotely from wall panel control switches.

FIG. 18 illustrates the system application for the Remote Application of the invention. As shown, utility controller enclosure 282 is located remotely from wall panel 284. Control wiring 286 extends from the wall box to PCB 100 located within the enclosure. From this point, output low voltage wiring 44 extends to each controlled device. In this illustration, the utility solenoids and interface relay 288 are within secondary enclosure 290. This enclosure is of suitable size and of common design to permit installation of this interface relay along with a remote relay.

This interface relay is of common electrical double throw (N/O-N/C) design so that control wiring can latch and de-latch the remote relay. In this illustrated application, a common mechanically held electrical contactor is utilized to provide circuit control to the electrical outlets at the station or area serviced by the Remote Application Controller. This interface is energized with current through its N/O contacts to the latching coil on the contactor. Likewise, when the control signal is withdrawn by the controller, N/C contacts provide current to the de-latching coil.

Figure 18A:
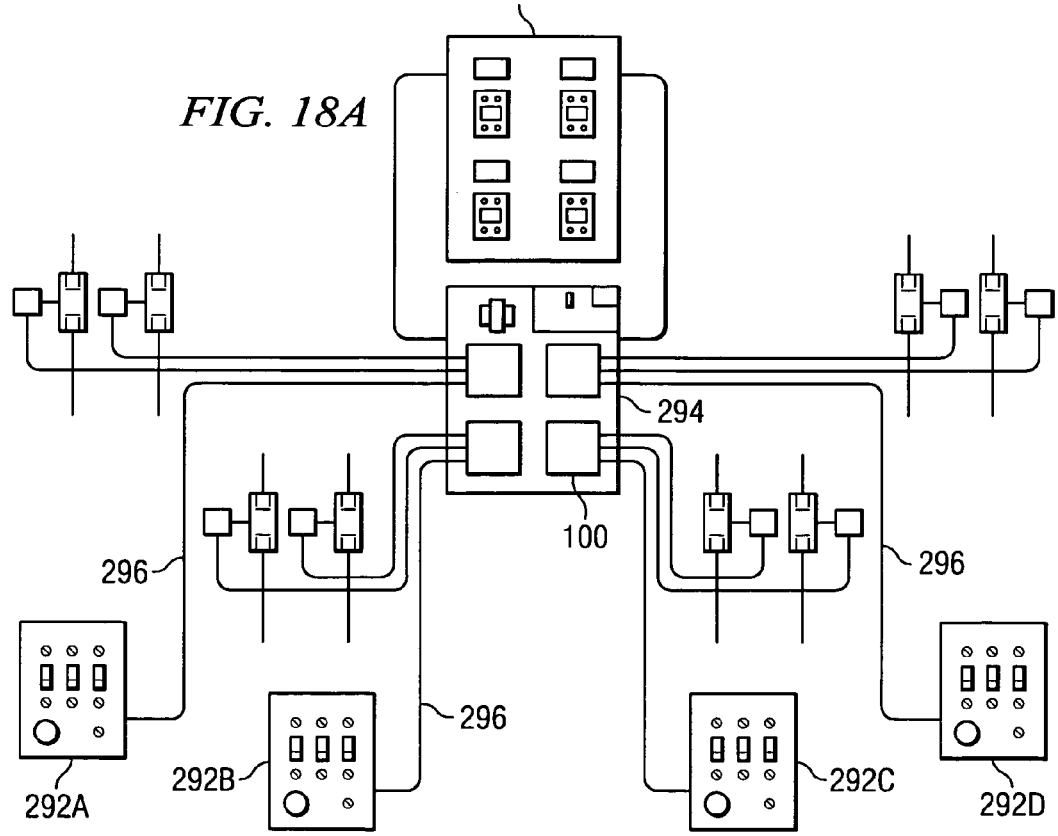

FIG. 18A demonstrates another advantage of the Remote Application Controller. In this example, four independent wall panels 292A, 292B, 292C and 292D, located in four independent classrooms are used to control the services within each. A common Multi-Station Controller 294 is located remotely from all of the wall panels. Control wiring 296 extends from each panel to the controller. Likewise, low voltage wiring 44 provides control wiring to each controlled device or service. In this instance, the four remote relays 66 along with interface relays 288 are housed in a common secondary enclosure 298.

Figure 19:
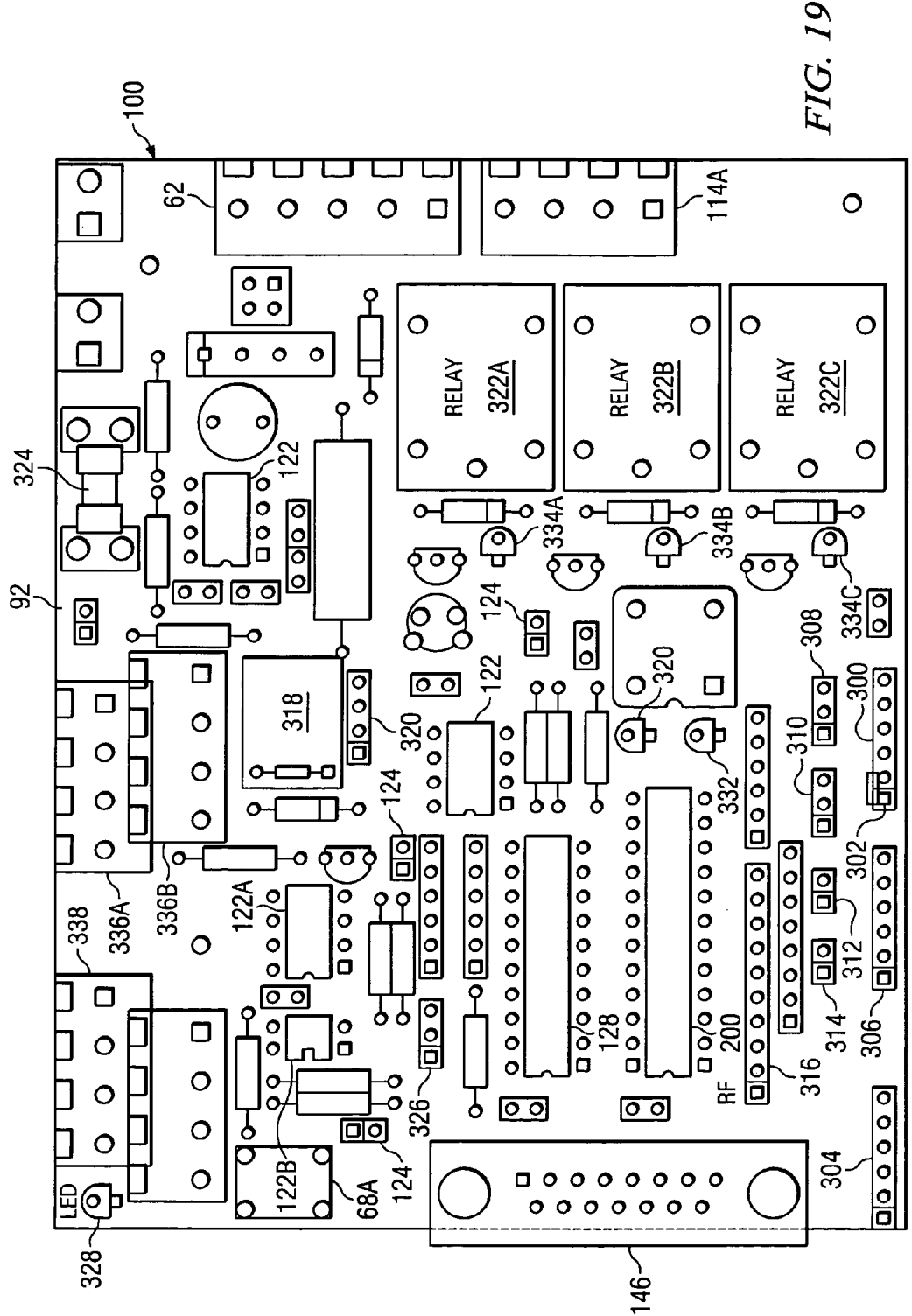
FIG. 19 illustrates another embodiment of the full PC board used with the utility controller of FIG. 11.

Referring now to FIG. 19 there is shown another embodiment of the present invention that features modular add on components that permits ease in configuration of the unit during manufacturing as well as allowing upgrades to easily be added after installation.

Auxiliary and remote circuits can be added to the Utility Controller by means of plug-in type printed circuit board modules. As was the case discussed with respect to the embodiment of FIG. 18, configuration jumper pins on the printed circuit board enables re-configuration for the various types of add-on modules. These add on circuits can be added to the unit during factory assembly or after installation. After installation circuits may incorporate add-on switch packets. For example, both styles of modules can serve to activate exhaust fans for the purposes of quickly purging a room after an emergency. This can help prevent a panic situation.

Another improvement provided is a single pole relay in lieu of the present double pole relay so as to permit greater output loads per circuit. This feature permits more than one controlled device such as a pair of solenoids for domestic hot and cold water to be controlled by a single output circuit with less risk of circuit overload. Addition of an output circuit fuse prevents possible damage to the printed circuit board due to output circuit shorting.

Radio frequency "RF" hand-held remote controls that permit the user to activate and deactivate the various circuits form any position within the room can be added to the unit after installation with the modular design of an add-on printed circuit board.

The embodiment of FIG. 19 also permits monitoring by other automation systems such as a facility's fire alarm system or an energy management system. This feature permits the unit to broadcast a notification signal in the case of an emergency. This monitoring feature is accomplished by the insertion onto the printed circuit board of a double pole relay that can be configured to provide either a 24-vac output signal and a single dry contact (i.e. not connected to a voltage lead); or a pair of dry contacts.

By the addition of add-on time delay circuitry, the notification or monitoring signal can be delayed so as to permit the instructor or other person of authority time to reset from a panic signal prior to notification in a situation where the panic mode was generated unintentionally or without sufficient reason.

Added input ports on the controller's printed circuit board allows the unit to accept input signals from a second and third automation system such as a facility fire alarm system. Terminals are also provided to accept an "active" signal from an emergency shower unit. A third input port connected to an "opto" isolator allows for a "user defined" input, meaning that the user of the unit can integrate any type of warning or alarm device as they choose to place the unit into the panic mode, providing that such devices provide a low voltage output signal upon activation.

The programming equations of the programmable logic device are reconstructed to capitalize upon the enhancements. The clock divider of the equations has been eliminated, making way for required resources necessary for the added features.

As discussed above with respect to the embodiment shown in FIG. 18 of the invention, an "opto isolator" 122 is used in the design so as to accept an input signal from a facility's "EMS" system. Referring to FIG. 19, there is shown a second embodiment of the PCB, identified as PCB 100A. Isolator 122 along with a second "opto-isolator" 122A used to accept an input from a facility alarm system. Similar to the "EMS" signal, the alarm input signal interacts with the programming logic to permit shutdown of the system in the case of a signal from the fire alarm system. A third "opto isolator" 122B accepts a signal from another source. This third device is a 4-pin/AC line monitor that will accept wither an AC or DC input signal to achieve activation. Since this device has no pre-determined function, it is referred to as a "user defined" input feature. Activation of the device will place the system into the panic state. As shown in the figure like previous embodiments, jumper post 124 (now located at about the center of PCB 100A) permits configuration for either 24-vac or 5-vdc inputs to each of the three opto inputs.

Still referring to FIG. 19, along the base of the printed circuit board are three six-pin terminals. Terminal 300 accepts an add-on module for an auxiliary output circuit. In configurations not requiring an add-on module then a jumper 302 is placed across the farthest left two posts so as to provide the needed ground connection to the door panel. In a similar manner, terminals 304 and 306 provide for two additional output circuits. Directly above these terminals are the configuration jumper posts 308, 310, 312, and 314. Placing a jumper on the appropriate post 308 allows for the "panic" signal on terminal 300 to be configured for either a panic signal or a "fan-on" signal. Jumper on post 310 allows for the use of the wiring from the door panel harness to be used for another output circuit when an installation application includes other features or RF components of the invention to be discussed later. In this case, the key-switch wiring can be used as a switch for the auxiliary circuit that is connected to terminal 304. Post 312 replaces the previously descried technique in other embodiments, which used the terminals for configuration of re-keying or reset after use of a panic button. A jumper placed across the posts 314 provides for the wiring from the door panel panic button to be utilized to place the system into panic as discussed in the above embodiments. Removal of the jumper will allow for an additional output circuit switch to be used by connecting to terminal 304.

Unlike the embodiments of the invention discussed above, the RF portion of the circuitry may be plugged into the system at terminal 316. Where RF is not incorporated into the system the jumpers placed across each pair of the right six pins of the terminal (show in dotted line) bypass the add-on circuitry of the RF feature. However removal of these jumpers and insertion of a 10-pin connector, a RF module becomes integrated into the system.

Relay 318 is provided so that output signals can be provided so as to permit monitoring by various building automation systems. The relay 318 is a double pole relay so as to permit two output circuits. The coil of relay 318 is connected to the panic output circuit of the system so that it is energized upon receiving a panic signal. One of the two output circuits of this relay will always provide an unconnected or dry contact source so that monitoring by an automations system may be self-induced. Configuration post 320 permits the second set of contacts of the relay to be configured dry or as unconnected contacts or as a 24-vac output signal. Placing a pair of jumpers at the two right and two left posts will configure the output as 24-vac, whereas placing a single jumper across the middle two posts configures the outputs as a dry or unconnected contact.

The three single pole output relays 322A, 322B, and 322C replace the double pole relays discussed with regard to FIG. 10. These relays being single pole have a less limiting output current rating such that the snubbing circuitry can be omitted since inductive loads have less affect on their operation. Also, since only one leg of the output circuit is switched by the controller, fewer wire leads are required to be placed from the printed circuit board to the output terminals. A common is provided for all outputs while addition of fuse holder and fuse 324 protects the output circuits from potential damage that may be caused by user mis-wiring of output circuits. Therefore, output connector 114A can be modified from the previously required 6-pin to a 4-pin connector.

Post 326 is the "EMS" configuration post. Placing a single jumper to the left two posts permits operation of the system without an "EMS" signal. Placing the jumper on the right two posts requires either a 5-vdc or 24-vac input signal from "EMS" in order for the system to operate.

Panic reset switch 68 has been omitted from the device's control panel and replaced by a circuit board switch 68A and LED 328. LED 330 is provided in this embodiment and indicated that the unit is in the enabled mode meaning that based upon PCB configuration that an enabling "EMS" signal is present. LED 332 indicates that an alarm signal is present. The three LED's 334A, 334B, and 334C indicate that each of the adjacent output circuit relays 322A, 322B, and 322C are energized.

The connection for optional 5-vdc output for user convenience has been relocated on the board, and plug 146 has been realigned vertically on the board. Input and output points for integration of automation systems are arranged at connectors 336 and 338. Connection points include input from "EMS" and alarm; outputs for monitoring by two independent automation systems; a terminal for connection of a remotely located panic button; connection of the before described "user defined" input; alarm and panic 5-vdc outputs.

Figure 20A:
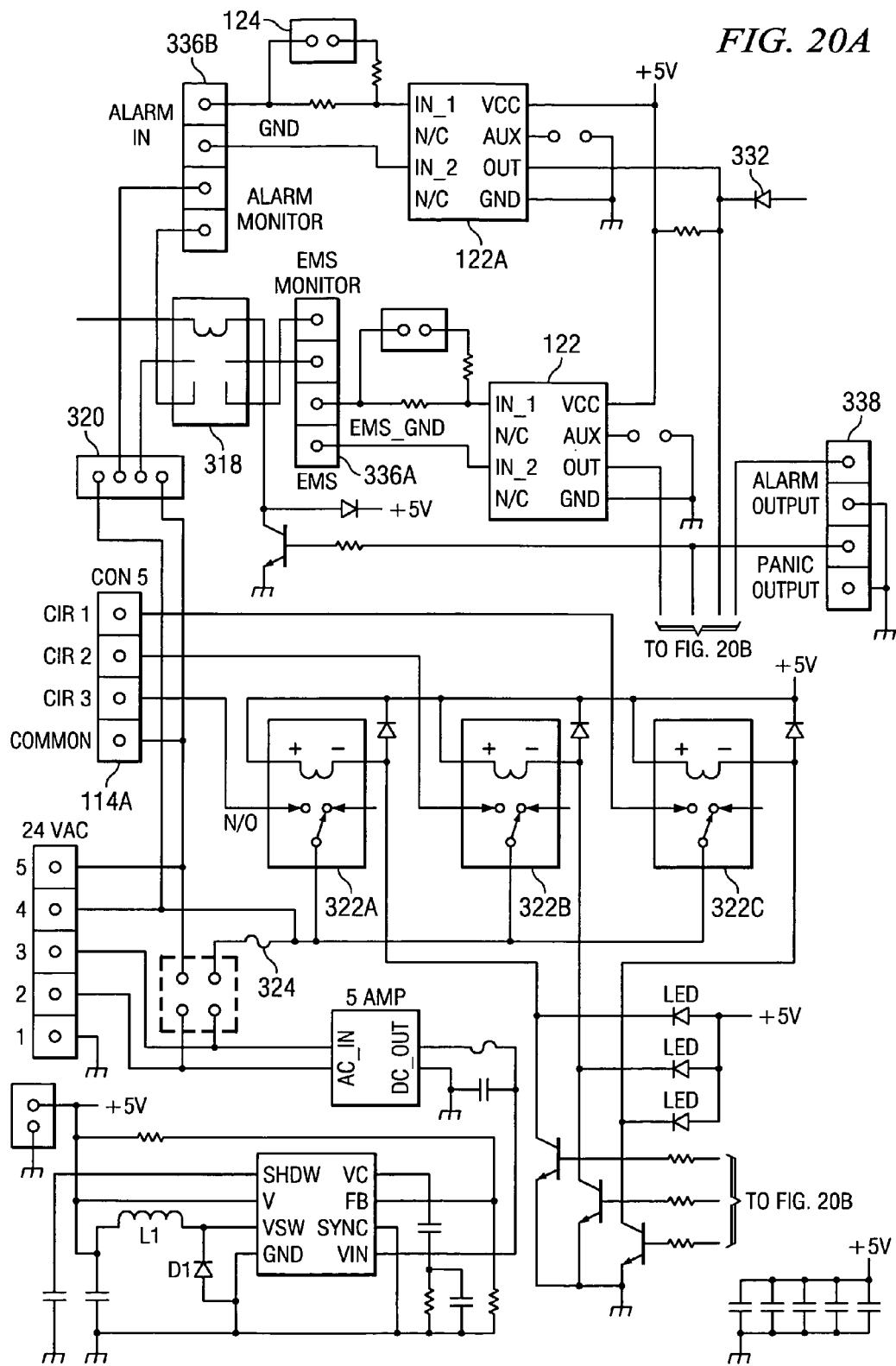
FIGS. 20A and 20B illustrate diagrams of specific circuits associated with the PC board of FIG. 19.
Figures 1, 20B:
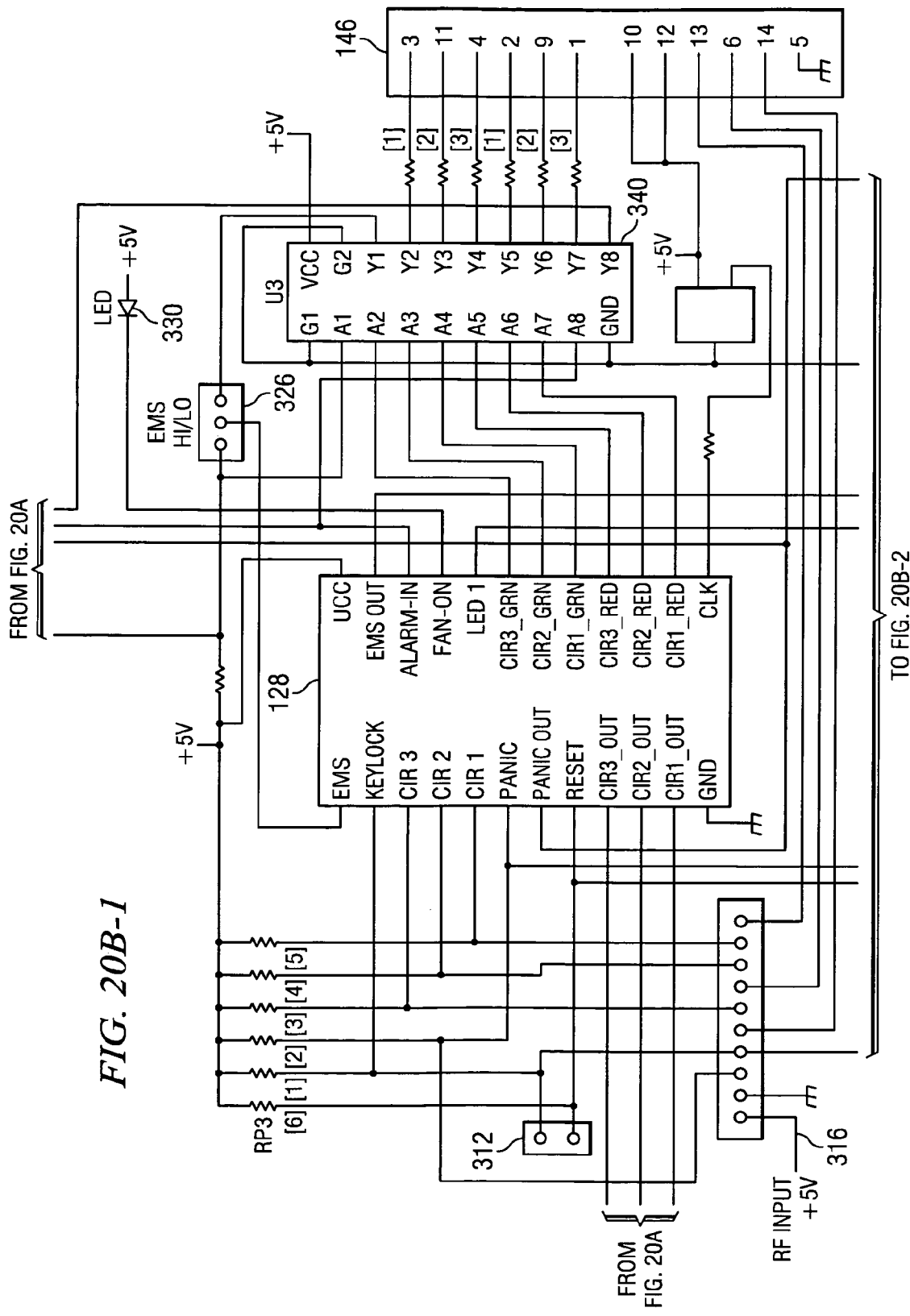
Figures 2, 20B:
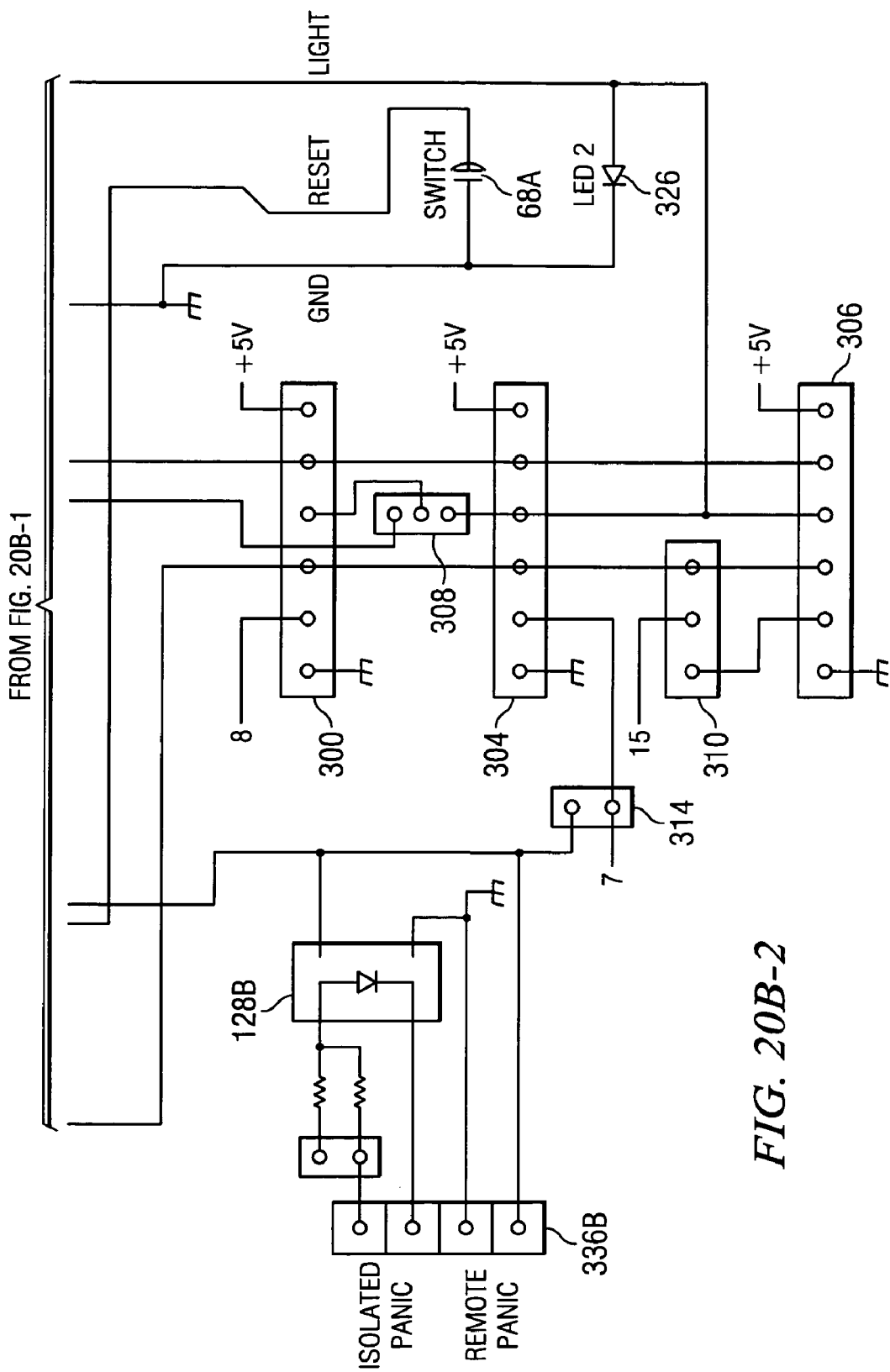

Wiring configurations and routing for the above-described enhancements of this embodiment of the invention are shown and further described in FIGS. 20 and 20A. FIGS. 20A and 20B detail output circuit components showing the use of a common output for one leg of each circuit with the independent routing first through fuse 324 and then to each of three relays 322A, 322B, and 322C. Wire tracings at configuration post 320 illustrate how the placement of a pair of jumpers across the left two and right two posts will configure the output for one side of relay 318 to provide a 24-vac output signal. Likewise, removing the two jumpers and placing a single jumper across the center two posts reconfigures the relay contacts to provide a dry contact. Contact points terminate at connector 336. As before mentioned, the configuration posts 124 serve to set resistor value for the opto isolators 122 and 122A.

Turning to FIGS. 20A and 20B the auxiliary output terminals 300, 304, and 306 located at the bottom of the diagram are used to provide output ports for various add-on components. At each terminal 300, 304, and 306 the right most pin is dedicated as a 5-vdc power source while the left most is connected to the PCB ground. From the right, the second pin is connected to the "EMS output" pin on the PLD 128, the third to "panic out", the fourth to "keylock ON", and the fifth dedicated to auxiliary switch. As before mentioned, placing a jumper across pins 4 and 5 of this terminal provides the second ground lead to the door panel for configurations not requiring auxiliary output circuits.

Configuration post 308 enables pin 2 on terminal 300 to accept an output operating signal from either "fan on" or "panic out". Having this option to select the source of the signal will enable an add-on modular printed circuit board to be configured so that where in one case requiring a "fan on" signal is needed for activation but a "panic out" signal would be inappropriate then the distinction can be made between the two types of signals.

By tracing the wiring from each pin at plug 146, the reader can see that pin 15 is routed through configuration post 310. For normal operation of the system having the door panel key switch activate services to "ON", a jumper is placed across the right two posts. This configuration directly links the key switch to the appropriate input pin on the PLD 128. Placing the jumper to the left violates this linking and instead routes the key switch input circuit to terminal 306 so that the circuit at pin 15 of plug 146 can serve to switch an auxiliary output circuit connected to terminal 306 instead of the normal function of "keying" of PLD 128.

Configuration post 314 enables pin 5 on terminal 304 to either act as an independent output circuit switch when the jumper is omitted. With this configuration, the link from the "panic" circuit of the door panel through plug 146 and PLD 128 is broken. With a jumper in place the "panic input" link between plug 146 and PLD 108 is established.

The opto isolator 122B is connected in parallel with the "panic input" from plug 146 and remote panic input at terminal 336B. This wiring configuration permits a remote panic button mounted elsewhere from the unit, a user defined component providing a input signal, and the panic button connected at plug 146 to each independently advance the PLD to the panic state.

Configuration post 326 routes "EMS" active signal either directly to PLD 128 or through the inverted circuit 34. This configuration permits the operation of the system without "EMS" by placing the jumper on the left two pins, or requiring "EMS" on the right two.

Configuration post 312 is the reset by key option jumper post. With no jumper in place, the PLD 128 must be reset by reset button 68A on PCB 100A. With the jumper in place, either the reset button or by re-keying will reset the PLD 128 from a panic status. LED 328 illuminates when the system enters a panic state.

Figure 21:
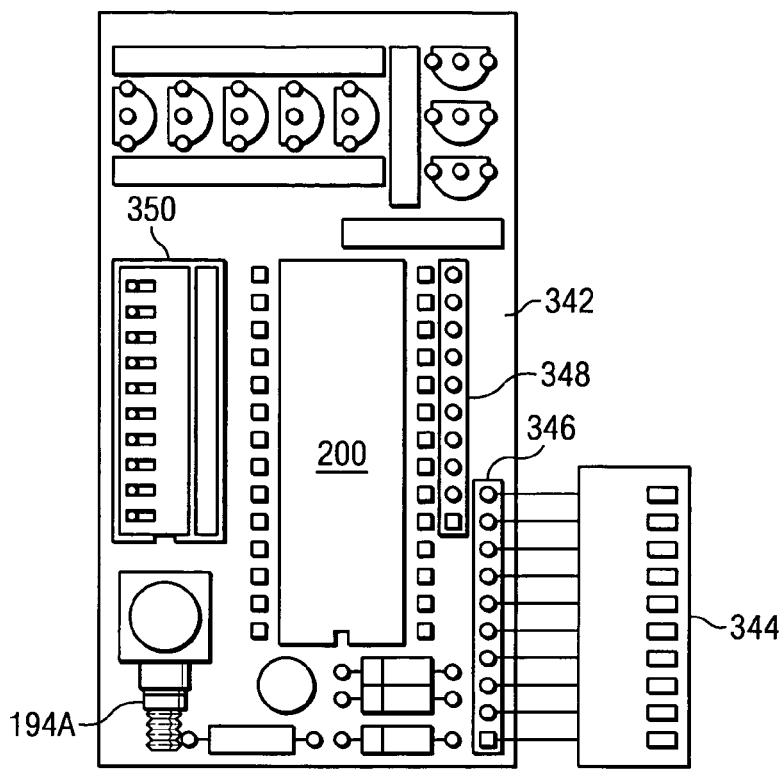
FIGS. 21 and 21A show an RF add-on module and the associated circuit diagram respectively.

Turning to the RF or "radio frequency" components, FIG. 21 is an image of an RF PCB 342. The PCB 342 is an add-on module to the invention's primary PCB 100A where connection is made by plug 344 on the RF circuit board 342 to the ten pin connector 316 on PCB 10A. This embodiment of the invention incorporates two wiring connection points. The primary wiring terminal points 346 are utilized when connecting to a unit with a single PCB. Terminal points 348 provide for a connection point for a second (not shown) ten pin connector for connection to a unit with dual PCBs as was discussed above. The multiple DIP switch unit 350 enables the selection of a unique address for encoder 200.

Figure 21A:
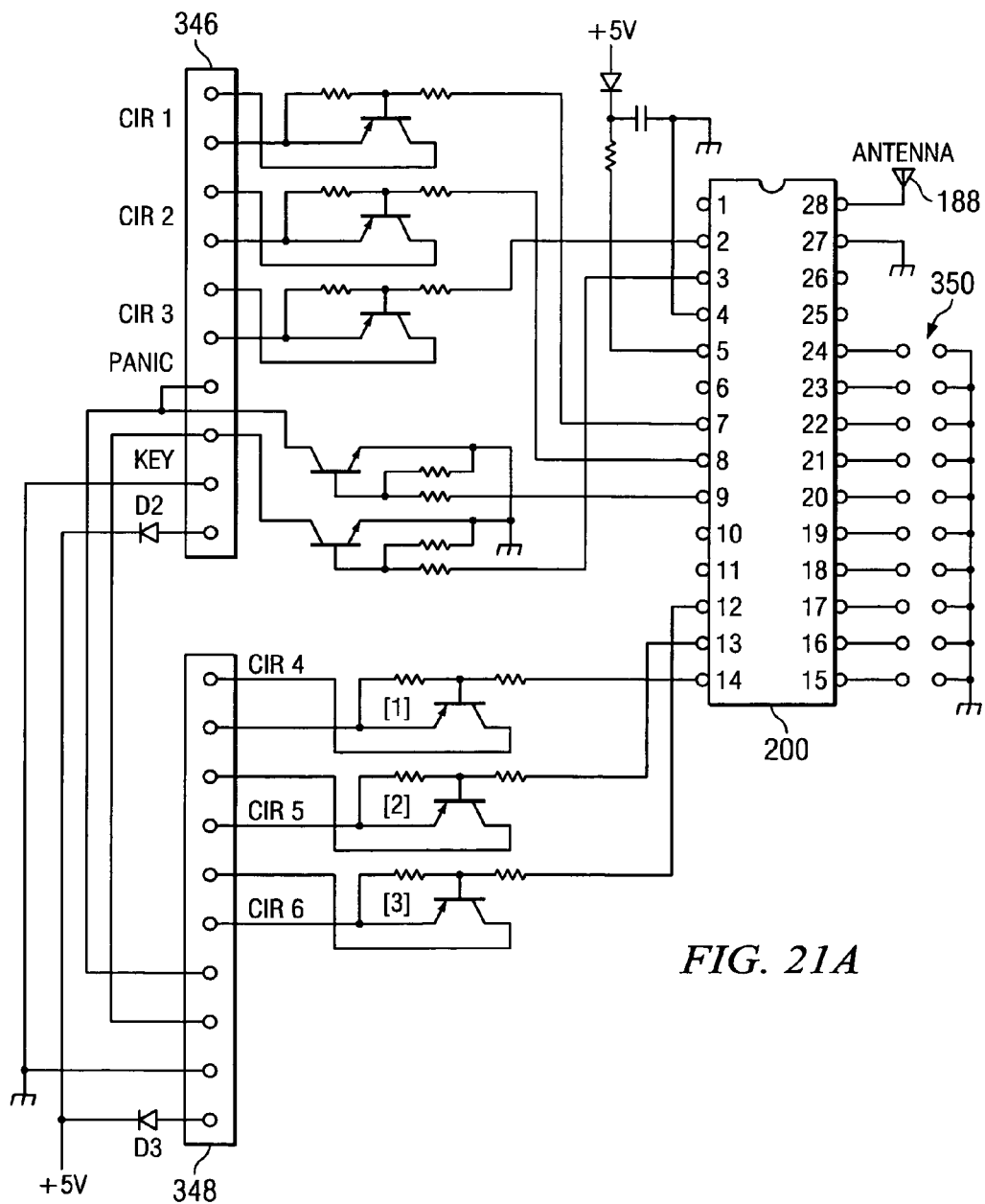

FIG. 21A is the wiring schematic of PCB 342. The reader will note that wiring and component configurations not discussed here are similar to that of the embodiment discussed with respect to FIG. 18 with the exception that these components locate on an independent PCB with wiring leads to the primary PCB in lieu of wire tracings. Though not detailed, connector 344 terminates at terminal 316 on the primary PCB 100 by removal of the three jumpers at that terminal and then insertion of this connector.

Figure 22:
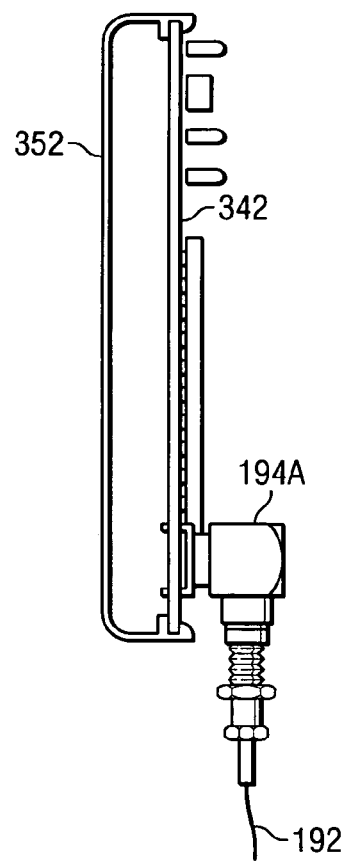
FIG. 22 is a side view of the modular add-on of FIG. 21 in place with the PC board of FIG. 19.

FIG. 22 details the installation method of the RF PCB 342. As shown PCB 342 will snap into a conventional mounting track 352 that is in turn mounted within the utility controller's enclosure. Antenna cable 192 is connected to antenna connector 194A at the PCB 342.

Figure 23:
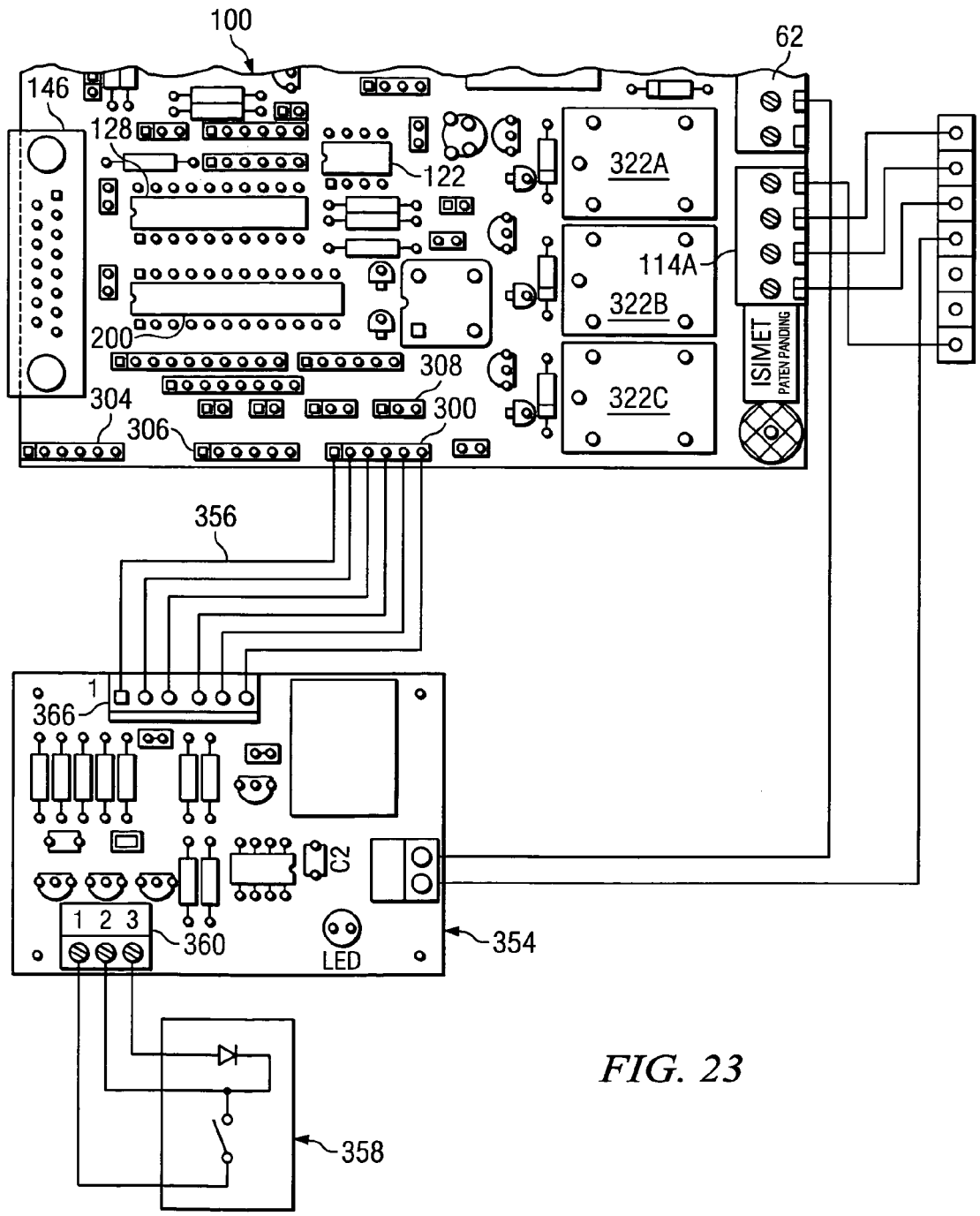
FIGS. 23 and 24 illustrate two further examples of modular add-on circuits.

FIG. 23 illustrates the simplicity of this embodiment of the invention when the application requires add-on output circuits. As shown add-on module PCB 354 has wiring harness 356 terminates at terminal 300 on PCB 100 with a connector. The reader will note that jumper post 308 has a jumper set to the "FAN-ON" posts. In this configuration, the "FAN-ON" signal fromt eh PLD 128 will activate the module upon "PANIC_IN" but not on an "ALARM_IN" signal, the "FAN-ON" signal will be inactive preventing the connected exhaust fan from becoming active in case of an input from an alarm system.

FIG. 23 also shows how an additional control panel 358 located remotely from the unit can be utilized to operate the auxiliary output circuit. This feature is primarily important when the user of the system elects to add components after initial instillation. In such instances, connection of PCB 354 could occur at terminal 306 or 304 and the switch wire lead at connector 300 would be omitted. Switching would occur at panel 358 through connector 360 on PCB 356. Switch 362 and LED 364 are common components used to switch and indicate active circuits.

Figure 23A:
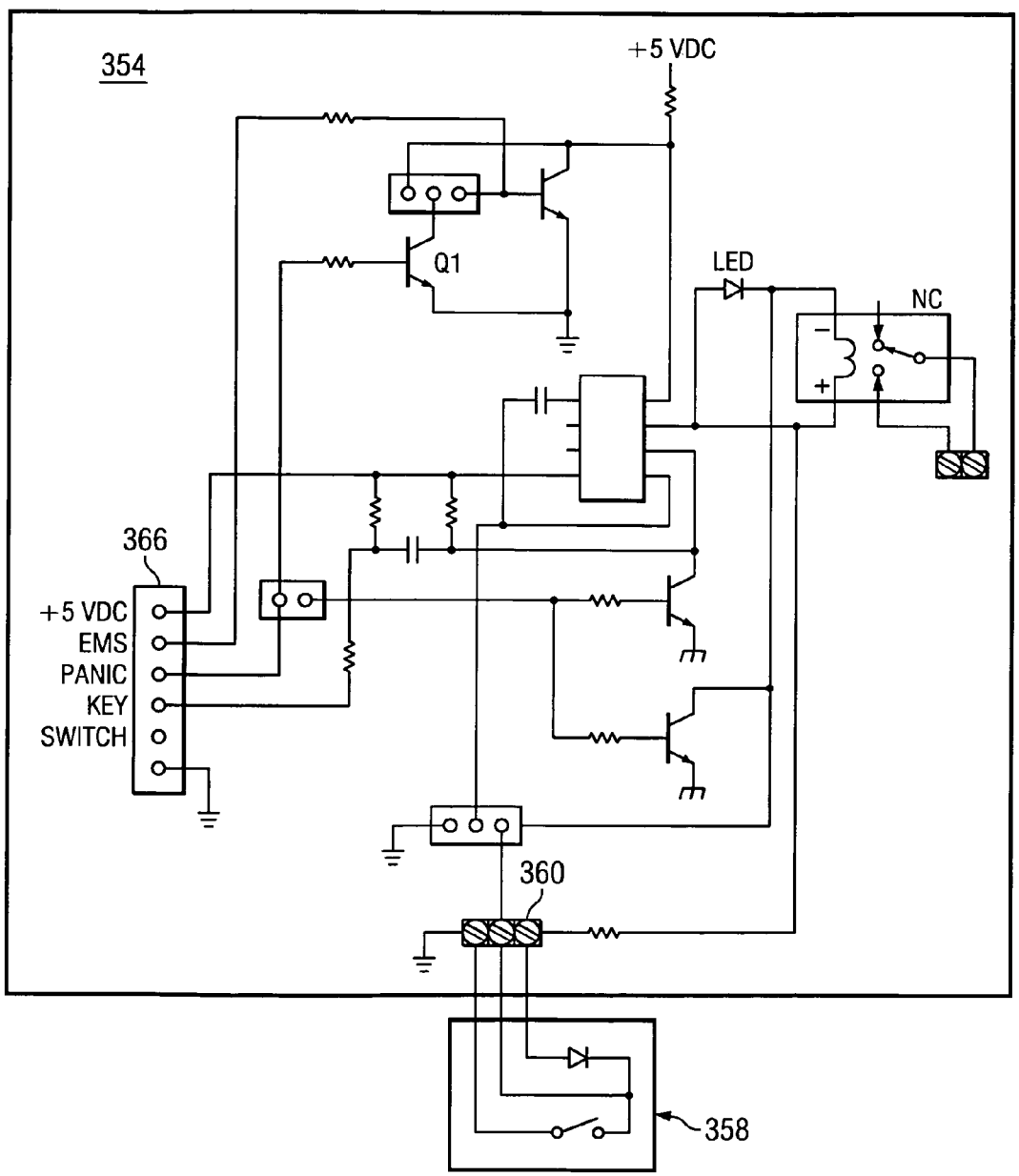

FIG. 23A shows configuration of PCB 354 utilizing connector 360 to terminate wiring leads from the remotely located panel. The reader will note that wiring and component configuration is similar to previous embodiments of the invention but with this added feature that permits the actual switching of the circuit to occur remotely from the PCB 354 and other integrated components.

An advantage of the time delay feature of this embodiment of the invention permits delay in notification upon a panic state of the device. By addition of this feature and where the system is integrated with and monitored by a building automation system such as a fire alarm system, in even of panic, notification signal is delayed for a determined period to allow for reset prior to notification. An example of an instance where the feature would be of benefit is a case where the panic button was pressed in error. Having a short delay in notification will prevent false signals to be transmitted. Thus an unneeded response to a false panic signal can be avoided by permitting a brief time to reset the system prior to notification.

Figure 24:
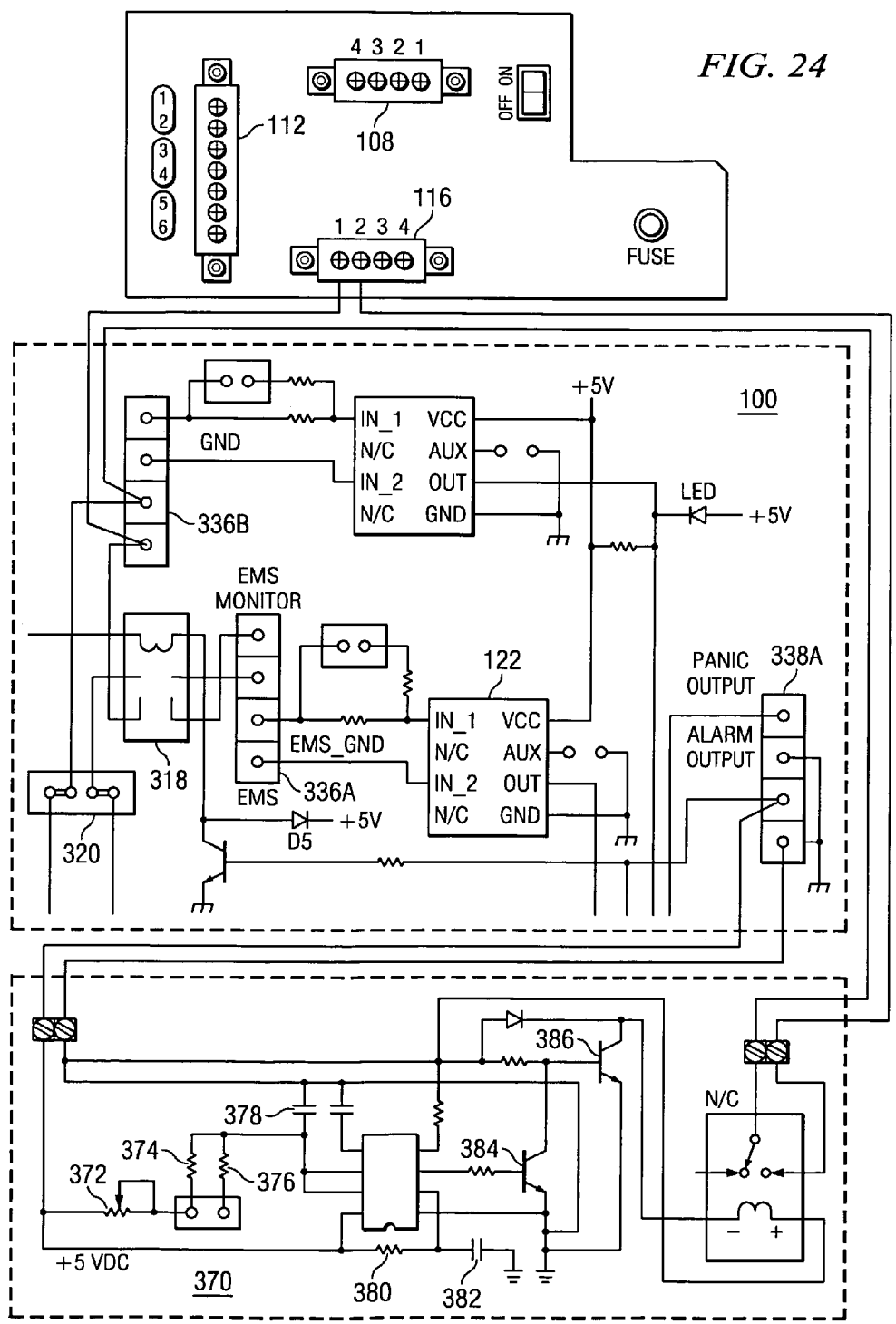

Referring to FIG. 24, the time delay of notification circuitry of the invention is discussed. A partial image of PCB 100 details that portion dedicated to the alarm and panic output circuits. Wiring leads originating from connector 338A are connected to connector 366 on time delay PCB 370. These leads provide a 5-vdc signal upon "panic" state of the PLD. Using the timing features of the time device 240 with variable resistor 372 in series with paralleled 374 and 376 resistors and capacitor 378, the adjustable time feature is accomplished at the threshold and discharge pins of the timer. Trigger "ON" occurs at the junction of resistor 386 and capacitor 382. Discharge begins upon applied voltage triggering the timer circuit by pulling pin 2 low. After discharge, trigger pin 2 goes high so as to prevent further unwanted triggering. During timing "ON" cycle pin 3 goes high. While pin 3 is high, transistor 384 is switched "ON". Transistor 384 collector is connected at the base and blocks base voltage of transistor 386 thus preventing switching. Upon termination of the time cycle, pin 3 goes low thus turning "OFF" transistor 384. Transistor 386 immediately switches thus activating relay 256. By this method output voltage connected from connector 336B on PCB 100 routed through connector 118 is delayed during the timing cycle. After the determined operation time of the timing device relay 256 is active providing the switched leg of a low voltage output signal originating from connector 336.

As also shown in the figure, the second leg of the output signal that routes through the "active upon panic" contacts of relay 318 terminates at terminal 116 on the control panel. Wire lead from terminal 118 likewise terminates along side at this terminal. By review of this figure the reader can determine for this embodiment that terminal 112 is a seven pin terminal thus permitting a common and isolated terminal post for each output circuit of the device. Terminals 108 and 116 are dedicated respectively to "EMS" input and monitoring; and alarm input and monitoring.

Modifications to equations of the discrete logic gates and flip-flops for the Utility controller allows the clock divider, to be omitted, this makes resources available for the additional input signals used in this embodiment of the invention.

Although the main focus of discussion of the various uses of the invention have been in the realm of science classrooms and such, the service panel and utility controller have usage in many varied applications. For instance, as discussed above, the utility controller can be remotely mounted from the service panel, then it has the capabilities of service in a stand-alone application. In retrofitting or renovating existing facilities where there already exists the controlling solenoids and/or electrical relays, the utility controller replaces existing switching while leaving in place the solenoids and relays.

In other instances where electrically powered equipment such as saws, grinders, pumps and presses are utilized (e.g. within a school shop classroom), the utility controller can provide the same level of secured activation as that provided in the science classroom. This is accomplished by activating remote electrical relays in lieu of solenoids. Though relays have been shown thus far as 24 VAC or 110 VAC, the electronic controller can be suited for a DC signal to be sent as well.

In instances where water or other liquids are required to be regulated and controlled with convenience as the priority rather than security, then the utility controller can provide this regulation and control. Such instances would be public shower facilities.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A modular utility controller comprising:
   an enclosure having a limited access interior region;
   at least one utility actuator for switching between an "ON" state and an "OFF" state to control the availability of a utility;
   at least one readily accessible utility switch having an "ON" position and an "OFF" position for providing an ON and OFF request signals respectively to control circuitry;
   a limited access switch for providing a temporary activate signal to said control circuitry;
   at least one add-on module for providing additional features to said utility control system;
   control circuitry mounted on a printed circuit board within said interior region for providing an "ON" control signal to said at least one utility actuator to switch said at least one utility actuator to said "ON" state, said "ON" control signal being provided only when both said "ON" request signal and said temporary active signals are present, said control circuitry further comprising connections adapted for connecting with said at least one add on modules and including a multiplicity of terminals, selected ones of said multiplicity of terminals adapted to be connected to other selected ones of said multiplicity of terminals for selectively programming the operation of said utility controller; and
   a readily accessible emergency shut-off control for providing a shut-down signal to said control circuitry, and said control circuitry further adapted to provide an "OFF" control signal to said at least one utility actuator to switch said at least one utility actuator to an OFF state, said shut-down signal continually disabling said utility actuator until said utility control system is reset.

2. The utility control system of claim 1 wherein said enclosure includes a cover and further comprises a locking apparatus cooperating with said cover for limiting access to said interior region.

3. The utility control system of claim 1 further comprising a reset switch mounted inside said limited access region for resetting said utility control system to provide said reset signal.

4. The utility control system of claim 1 wherein said at least one actuator comprises at least three actuators, one each of said three actuators controlling one of said gas, electricity and water utilities.

5. The utility control system of claim 1 wherein switching said utility switch to an OFF condition disables said utility switch until again enabled by a temporary activate signal from said limited access switch.

6. The utility control system of claim 1 wherein said control circuitry maintains said at least one utility actuator in the OFF state after said control system is reset following an emergency shutdown such that said at least one utility actuator can only be set to the ON state when said temporarily activate signal and said ON request signal are again present at the control circuitry at the same time.

7. The utility control system of claim 1 wherein at least one of said utility actuators is remote from said utility controller.

8. The utility control system of claim 1 wherein said add on module is an RF control module for generating ON and OFF request signals and further comprising a remote transmitter for providing RF signals received at said RF add on module to cause said module to generate said ON and OFF request signals.

9. The utility controller of claim 8 wherein said RF transmitter is a hand-held transmitter.

10. The utility control system of claim 1 wherein said control circuitry provides a control signal to place said actuator in the OFF condition in response to an EMS (Energy Management System) signal.

11. The utility control system of claim 1 wherein said control circuitry comprises a state controller such that said control circuitry remains in a selected state until the state of the control circuitry is changed by an input signal.

12. The utility control system of claim 1 further comprising an add on module for providing a control signal to place said actuator in the OFF condition in response to a signal from a facility fire alarm system.

13. The utility control system of claim 1 further comprising time delay circuitry such that a notification or monitoring signal is delayed before being sent to allow time for a reset at the controller.

14. The utility control system of claim 8 wherein said remote transmitter further provides an RF signal for generating said shutdown signal.

15. The utility control system of claim 8 wherein said remote transmitter comprises a plurality of switches for providing selected RF signals.

16. A utility control system comprising:
   an enclosure having a limited access interior region;
   a first and second set of utility actuators, each actuator of said first Set for switching between an "ON" state and an "OFF" state to control the availability of a selected utility, and each actuator of said second set for switching between an "ON" state and an "OFF" state in response to at least one second control signal to control the availability of another selected utility;
   at least one readily accessible utility switch for providing said at least one first ON request signal and at least one first OFF request signal to a first control circuitry;
   at least another readily accessible utility switch for providing at least one second ON request signal and at least one second "OFF" request signal to a second control circuitry;
   a limited access switch for providing a temporary activate signal to said first and second control circuits;
   at least one add-on module for providing additional features to said utility control system;
   first control circuitry mounted within said interior region for providing at least one first "ON" control signal to at least on actuator of said first set of utility actuators to switch said at least one actuator to said "ON" state, said first "ON" control signal being provided only when both said "ON" request signal and said temporary activate signal are present at the same time said first control circuitry further comprising connections adapted for connecting with said at least one add on module and including a multiplicity of terminals adapted to be connected to other selected ones of said multiplicity of terminals for selectively programming connected to other selected ones of said multiplicity of terminals for selectively programming it's operation of said utility controller;
   second control circuitry mounted within said interior region for providing said at least one second "ON" control signal to at least one actuator of said second set of utility actuators to switch said actuator of said second set to said "ON" state, said second "ON" control signal being provided only when both said "ON" request signal and said temporary activate signal are present at the same time, said second control circuitry further coupled to said first control circuitry;

a readily accessible emergency shut-off control for providing a shut-down signal to said first and second control circuits, said control circuits further adapted to provide "OFF" control signals to said first and second set of actuators to switch said utility actuators to an "OFF" state, said shut-down signal continually disabling said utility actuators until said utility control system is; and a reset switch mounted in said limited access interior region to provide said reset signal.

17. The utility control system of claim 16 wherein said enclosure has a cover, and further including a locking apparatus cooperating with said cover for limiting access to said interior region.

18. The utility control system of claim 16 wherein switching said utility switch to an off condition disables said utility switch until again enabled by a temporary activate signal from said limited access switch.

19. The utility control system of claim 16 wherein at least one of said utility actuators is remote from said utility control system.

20. The utility control system of claim 16 wherein at least one of said first and second control circuitry further comprises a "state" controller such that said control circuitry remains in a selected state until the state of the controller is changed by an input signal.

21. The utility control system of claim 18 wherein said first and second control circuitry maintain actuators in said OFF state after said control system is reset following an emergency shutdown such that said utility actuators can only be set to the ON state when said temporary activate signal and said ON request signals are again present at the same time at said first and second control circuits.

* * * * *